(12) United States Patent  (10) Patent No.: US 9,176,591 B2
Nair  (45) Date of Patent: Nov. 3, 2015

(54) DATA ENTRY DEVICE (DED)

(76) Inventor: Prem Kumar Nair, Haryana (IN)

( * ) Notice: Subject to any disclaimer, the term of this patent is extended or adjusted under 35 U.S.C. 154(b) by 603 days.

(21) Appl. No.: 13/496,297

(22) PCT Filed: Sep. 15, 2010

(86) PCT No.: PCT/IB2010/002312
§ 371 (c)(1),
(2), (4) Date: Mar. 15, 2012

(87) PCT Pub. No.: WO2011/033363
PCT Pub. Date: Mar. 24, 2011

(65) Prior Publication Data
US 2012/0176310 A1    Jul. 12, 2012

(30) Foreign Application Priority Data

Sep. 16, 2009  (IN) .......................... 1918/DEL/2009

(51) Int. Cl.
*G06F 3/02* (2006.01)
*G06F 1/16* (2006.01)
(52) U.S. Cl.
CPC ............ *G06F 3/0213* (2013.01); *G06F 1/1664* (2013.01); *G06F 3/0216* (2013.01)
(58) Field of Classification Search
CPC .................................................. G06F 3/0216
See application file for complete search history.

(56) References Cited

U.S. PATENT DOCUMENTS 207,559 A    8/1878  Latham
2,040,248 A    5/1936  Dvorak et al.

(Continued)

FOREIGN PATENT DOCUMENTS

CN    1229209    9/1999
CN    1305138    7/2001
CN    1305138 A  *  7/2001
CN    2478171    2/2002

OTHER PUBLICATIONS

International Search Report for international application No. PCT/IB2010/002312, dated Jul. 14, 2011 (4 pages).

(Continued)

*Primary Examiner* — Jason Olson
(74) *Attorney, Agent, or Firm* — Hamre, Schumann, Mueller & Larson, P.C.

(57) ABSTRACT

The present invention provides a Data Entry Device for computers and other devices. An embodiment of the present invention provides a Data Entry Device combining a keyboard and pointing device for computers and other devices; The Data Entry Device of the present invention introduces a completely new ergonomic construction for all keys. In the Data Entry Device of the present invention the keyboard and pointing device can both be used without shifting the hands from its initial resting position and where the shift key has to be used only for capitals and a few rarely used punctuations and symbols. The vowels are all on one side thus making them easy to access and use. All the letters are arranged so that on maximum occasions the letters are alternating between hands. The character keys are separated into alphabets, numerals, mathematical operators, punctuations and symbols. The placement of the characters on the DED is based on their frequency of occurrence in the environment, the ideal workload that should be allotted to each finger, the order of ease of use of keys, their pattern of use and similarity of type. In the present invention the concept of Home Row for fingers has been replaced by Home Keys for each finger being the keys on which the fingers tend to rest naturally and is not in one row. All this together makes the DED easy to comprehend, easy to learn, easy to use, more difficult to forget, increase the speed of typing, reduce errors and makes the user less prone to medical problems.

19 Claims, 11 Drawing Sheets

(56) References Cited

U.S. PATENT DOCUMENTS

| | | | | |
|---|---|---|---|---|
| 5,006,001 | A | * | 4/1991 | Vulcano ............... 400/486 |
| 5,584,588 | A | | 12/1996 | Harbaugh |
| 5,971,636 | A | | 10/1999 | Mensick |
| 6,241,406 | B1 | | 6/2001 | Yan |
| 7,137,749 | B2 | | 11/2006 | Wedding |
| 8,226,308 | B1 | * | 7/2012 | Borg ............... 400/486 |
| 2004/0090422 | A1 | * | 5/2004 | Tsai ............... 345/168 |

OTHER PUBLICATIONS

Written Opinion for international application No. PCT/IB2010/002312, dated Jul. 14, 2011 (7 pages).

Colemak keyboard layout, located online at http://colemak.com, last modification date Nov. 25, 2009 (2 pages).

International Preliminary Report on Patentability for international application No. PCT/IB2010/002312, dated Apr. 9, 2012 (16 pages).

* cited by examiner

| Left Half | | | | | M | Right Half | | | | |
|---|---|---|---|---|---|---|---|---|---|---|
| Pinkie | Ring | Middle | Index | | A T H | Index | Middle | Ring | Pinkie | |
| LP4 26 | LP3 24 | LR2 12 | LM2 10 | LI2 8 | K E Y P A D | RI2 7 | RM2 9 | RR2 11 | RP3 23 | P4 25 |
|  | LP2 22 | LR1 6 | LM1 4 | LI1 2 | | RI1 1 | RM1 3 | RR1 5 | RP2 21 | |
|  |  | LP1 20 | LR3 18 | LM3 16 | LI3 14 | | RI3 13 | RM3 15 | RR3 17 | RP1 19 |

(Note: bottom row alignment)

| Left Half | | | | | | Right Half | | | | |
|---|---|---|---|---|---|---|---|---|---|---|
| Pinkie | Ring | Middle | Index | | | Index | Middle | Ring | Pinkie | |
| LP4 26 | LP3 24 | LR2 12 | LM2 10 | LI2 8 | | RI2 7 | RM2 9 | RR2 11 | RP3 23 | P4 25 |
|  | LP2 22 | LR1 6 | LM1 4 | LI1 2 | | RI1 1 | RM1 3 | RR1 5 | RP2 21 |  |
|  | LP1 20 | LR3 18 | LM3 16 | LI3 14 |  | RI3 13 | RM3 15 | RR3 17 | RP1 19 |  |

FIGURE 6

| Left Half | | | | | M A T H | Right Half | | | | |
|---|---|---|---|---|---|---|---|---|---|---|
| Pinkie | Ring | Middle | Index | | | Index | Middle | Ring | Pinkie | |
| Z 26 | Q 24 | C 12 | H 10 | S 8 | K E Y P A D | O 7 | L 9 | D 11 | X 23 | J 25 |
|  | K 22 | R 6 | N 4 | T 2 | | E 1 | A 3 | I 5 | V 21 | |
|  | W 20 | Y 18 | G 16 | M 14 | | U 13 | P 15 | F 17 | B 19 | |

FIGURE 7

| Left Half | | | | | M A T H | Right Half | | | | |
|---|---|---|---|---|---|---|---|---|---|---|
| Pinkie | Pinkie | Ring | Middle | Index | | Index | Middle | Ring | Pinkie | Pinkie |
| Q | W | E | R | T | K E Y P A D | Y | U | I | O | P |
|  | S | D | F | G | | H | J | K | L | |
|  | X | C | V | B | | N | M | A | Z | |

| Left Index | | | Right Index | | |
|---|---|---|---|---|---|
| ( | 7 | 8 | 9 | + | ) |
| [ | 4 | 5 | 6 | - | ] |
| { | 1 | 2 | 3 | × | } |
| < | 0 | . | = | ÷ | > |

FIGURE 9(a)

| Left Index | | | Right Index | | |
|---|---|---|---|---|---|
| ( | 7 | 8 | 9 | + | ) |
| [ | 4 | 5 | 6 | - | ] |
| { | 1 | 2 | 3 | × | } |
| < | 0 | . | = | ÷ | > |
| AC ENTER | | | SPACE | | C |

FIGURE 9(b)

| Left Index | | | | Right Index | | | |
|---|---|---|---|---|---|---|---|
| 6 | $ | 8 | £ | 7 | € | 5 | * |
| 2 | @ | 4 | # | 3 | % | 1 | & |
| 14 | _ | 16 | - | 15 | ` | 13 | ^ |
| 6 | ; | 8 | : | 7 | ! | 5 | ? |
| 10 | \ | 12 | ~ | 11 | \| | 9 | / |
| 2 | , | 4 | ` | 3 | " | 1 | . |

FIGURE 10

DATA ENTRY DEVICE (DED)

FIELD OF INVENTION

The present invention relates to a data entry device, particularly, the present invention relates to a keyboard for entering data and operating computers and other devices, more particularly, the present invention relates to a keyboard with ergonomic construction of keys.

BACKGROUND OF THE INVENTION

At present, the International Business Machines Windows Keyboard (IBMW Keyboard) is the standard keyboard used with computers. The construction of this keyboard is followed by all manufacturers with minor variations depending on additional features included and the specific field of use of the keyboard.

The IBMW Keyboard being a product evolved over time, its design and keypad construction are not conceptualised in a holistic manner taking all aspects into consideration ab-initio. As a result, the construction of the IBMW Keyboard is neither systematic nor logical and does not take into account several ergonomic aspects. Therefore it has a large number of deficiencies, of which some major ones are as under:—
   (a) The size of the IBMW Keyboard is so large that all the keys on the keyboard cannot be operated without moving the hands from their natural resting position, particularly the numeric keypad, the arrow keys and other keys located on the right side of the keyboard.
   (b) Due to its large size, the keyboard does not fit into the field of view of the operator when he is looking at the display screen of the monitor.
   (c) The standard shape of the IBMW Keyboard is rectangular with the keys in a straight line whereas the natural resting position of the hands is tilting inwards approximately 25 degrees to the vertical running away from the operator. This makes typing on the keyboard with the hands kept at right angles to the keyboard a stressful process.
   (d) The construction of the keyboard is not symmetrical about the centre. This leads to asymmetrical tasking and movement of the hands.
   (e) The alphabet keys in the three rows and the numerals on the top fourth row are not aligned in a vertical line one below the other. There is a stagger between the rows with the second, third and fourth rows slightly to the right of the one above. This stagger is neither uniform from row to row nor is it symmetric about the centre. The stagger was necessary in mechanical typewriters but have no relevance in electronic keyboards.
   (f) The numeric keypad with mathematical operators is located to the right side of the main keyboard. To use these keys, the user has to move his right hand 18 cm to the right. Though there is also a second set of numerals and mathematical operators above the alphabets, the mathematical operators are not arranged in any logical order.
   (g) The pointing device or mouse is not part of the desktop keyboard. To use the mouse, the right hand has to move 25 cm to the right or the left hand has to move 18 cm to the left from the alphabet keys depending on which side the mouse has been placed.
   (h) The typing task performed by the hands especially the fingers are not based on their relative capacity to do work. This has resulted in a workload allotment that is not optimised, thereby overworking some and underutilising some fingers.
   (i) The standard alphabet keypad of the existing IBMW Keyboard is the QWERTY Keypad ((Inventor Christopher Latham, Sholes U.S. Pat. No. 207,559 issued on 27 Aug. 1878, see FIG. 1). This QWERTY Keypad was adopted for the early mechanical typewriters in the 1870s. Its primary aim was to keep the most often used keys well apart, so that the hammers which imprinted the images on the paper, when struck in quick succession did not stick to adjacent hammers. It was intended to deliberately reduce the speed of typing; a limitation imposed by the technical requirements of the time. The major drawbacks of the QWERTY Keypad are:—
      i. The allotment of typing workload to the fingers is not according to their relative capacity to do work. Similarly, the distribution of work to both hands is also not according to their relative capacity to do work.
      ii. The construction of the punctuation and symbol keys are not based on any logic. Further, to type the symbols the Shift Key has to be used, thus making even typing the frequently used symbols difficult.

Thus the conventional IBMW Keyboard is neither systematic nor logical. As a result, it does not lend itself to speed in typing, is not easy to use, is not easy to learn, is prone to errors and causes medical problems on prolonged use. Ergonomically too it is not a satisfactory device. It also does not have a standard dimension or construction between desktop computer and notebook computer keyboards. All these deficiencies together make it a very poorly constructed device.

However, billions of users of the IBMW Keyboard have no other option but to use this keyboard there being no ready alternative. Over the years many new keypads both in the overall construction and in the character key construction have been suggested but none of them have had universal appeal to be adopted as a new standard. Many of the improvements were only rearrangement of character keys on the existing construction of the IBMW Keyboard such as the DVORAK (U.S. Pat. No. 2,040,248), Wedding (U.S. Pat. No. 7,137,749), and COLEMAK Keypad (not patented: refer http://colemak.com/). There were others which aimed at changing the way the entire keyboard was laid out; such as the Harbaugh (U.S. Pat. No. 5,584,588) and Yan (U.S. Pat. No. 6,241,406: see FIG. 2) Computer Keyboards. However, these keyboards did not address all the issues concerned and some were far too radical to be appealing to the common man and compounded the existing problems rather than resolve them.

According to estimates, the World has over one billion PCs as of end 2009. This is expected to double by the year 2015. Of the existing PCs, about 180 million PCs would also soon become obsolete and would need replacement along with their keyboards. This implies that there will be at least 1.18 billion new PCs to be introduced into the environment in the next six or seven years along with keyboards. In addition, there will be users who would choose to replace their existing keyboards both on PCs and also other devices where keyboards are used, when a new keyboard is introduced.

However, all of the current and future keyboard users of whom a large proportion will be children and first time users have no choice but to use the existing keyboard for the rest of their lives; a keyboard that was neither developed logically nor following any, ergonomic principles and is mostly based on the QWERTY Keyboard designed for the early mechanical typewriter and patented in 1878 i.e. over 132 years ago.

Therefore, there exists a need for a new keyboard or data entry device which is systematic, logical, and ergonomic in design and consequently is easy to use, easy to learn, increases the speed and reduces the possibility of medical problems in prolonged usage and is independent of the technology available now or in the future.

OBJECTS OF THE PRESENT INVENTION

The main object of the present invention is to provide a data entry device.

Another object of the present invention is to provide a data entry device for computers.

Still another object of the present invention is to provide a data entry device for processing devices or any other device which requires data to be entered.

Yet another object of the present invention is to provide a data entry device which overcomes at least one of the problems associated with the existing data entry device.

Yet another object of the present invention is to provide a data entry device in which both the hands do not have to move from their initial position (defined as Standard Resting Position or SRP later) to operate any character key, operation key or the pointing device on the Data Entry Device (DED).

Still another object of the present invention is to provide a data entry device which is ergonomically constructed.

Yet another object of the present invention is to have a keypad for all keys such that the workload on each hand and each finger is according to their relative capacity to do work.

Yet another object of the present invention is to provide a data entry device which is usable with all the existing computers or other devices without any changes in the existing software or hardware other than the DED itself.

A further object of the present invention is to provide a data entry device with an integrated pointing device.

A further more object of the present invention is to provide a data entry device which minimises the possibility of medical problems in prolonged usage.

One more object of the present invention is to provide a data entry device which is easy to understand, easy to learn, easy to use and minimises errors in typing.

A further object of the invention is to provide a data entry device with modular construction such that the various groups can be used to construct keyboards that are suitable for left-handed persons and also for those persons who wish to use the device with a single hand either left or right.

SUMMARY OF THE INVENTION

The present invention provides a data entry device, particularly the present invention provides a keyboard for entering data and operating computers and other devices, more particularly, the present invention relates to a keyboard with ergonomic construction of keys that needs data to be entered by a user.

In an embodiment of the present invention, the DED comprises a keyboard and a pointing device in one unit. The DED can be manufactured without integrating the pointing device on it and can also be used with an external pointing device. Thus the flexibility and freedom of choice available now is retained.

The DED of the present invention comprises of all keys and facilities that are currently available on an IBMW Keyboard in addition to new ones. The Keys of the DED are assembled into type groups and the keys within the groups are arranged scientifically on the basis of sound logic. Thus the DED is not a mere arrangement or rearrangement of keys on the keyboard, or a duplication of a known device or one of merely integrating the pointing device and keyboard into one device.

The arrangement and the layout of the DED is intended to remove the observed weaknesses of the IBM Windows Keyboard and its variants; thus the Alphabet and all other character keys are constructed based on scientific methods and ergonomic principles that are explained later. The placement of the pointing device on the keyboard is also based on ergonomic principles and enables its use without moving the hands from the initial position.

Thus it is re-iterated that the entire DED is novel in construction and involves many inventive steps as explained in the body of this document.

According to an embodiment, the DED of the present invention comprises all keys available on the IBM Windows Keyboard, the pointing device and a few additional keys for new features. Specifically the DED of the present invention incorporates the following novel and inventive steps which are explained in detail in the main body of this document. The DED:—

(a) Enables the use of the keyboard and the pointing device by both hands of the user without moving them from the initial position in which they are placed on the DED. That is once you place your hands on the DED you do not have to move them from that position to operate any key, function or pointing device.

(b) The workload distribution is such that the workload allotted to the left and right hands are according to their respective capacities to do work. And further the workload on each finger and thumb is according to their capacity to do work.

(c) Has an Alphabet Keypad divided into two halves with both halves being symmetric to each other. The letters of the Alphabet are arranged in such a manner that the more frequently used letters are on the easier to use keys and are typed by the easier to use fingers. And that this arrangement of letters has been arrived at by a scientific method (explained later) such that the total workload of typing on each finger is proportional to the capacity of each finger to do work.

(d) Further the Punctuations, Symbols, Numerals, Mathematical Operators and other characters have been placed together in separate groups. And that within each group of keys there is a scientific method for their layout based on ergonomic principles and reasoning applicable to that group of keys or a specific key.

(e) Further that all operation keys are scientifically placed according to how and in what combination they are likely to be used.

(f) Further the DED has indicators for important functions placed in such a way that they are in the centre of the field of view. This is intended to reduce the scope for error.

Thus the DED is not a mere arrangement or rearrangement of keys, a duplication of known devices or one of merely integrating the keyboard and pointing device into one unit.

The DED is a device invented taking into all aspects of data entry into computers including workload on fingers and hands, ergonomics, medical issues, reduction of errors, ease of learning and size of keyboard and other issues explained in the document in a holistic manner.

BRIEF DESCRIPTION OF FIGURES

FIG. 5 illustrates the Alphabet Keypad showing allotment of fingers to keys, the Order of Ease of Use (OEU) of keys allotted to each finger and overall OEU of all the 26 alphabet keys according to an embodiment of the present invention.

FIG. 6 illustrates the DED Alphabet Keypad according to an embodiment of the present invention.

FIG. 7 shows a Modified QWERTY Alphabet Keypad on the DED Alphabet Keypad of the present invention in accordance of another embodiment of the present invention.

FIGS. 9(a) and 9(b) illustrate the DED Mathematical Keypad in accordance of an embodiment of the present invention.

FIG. 10 shows the DED Punctuation and Symbols Keypad according to an embodiment of the present invention.

Figure 1:
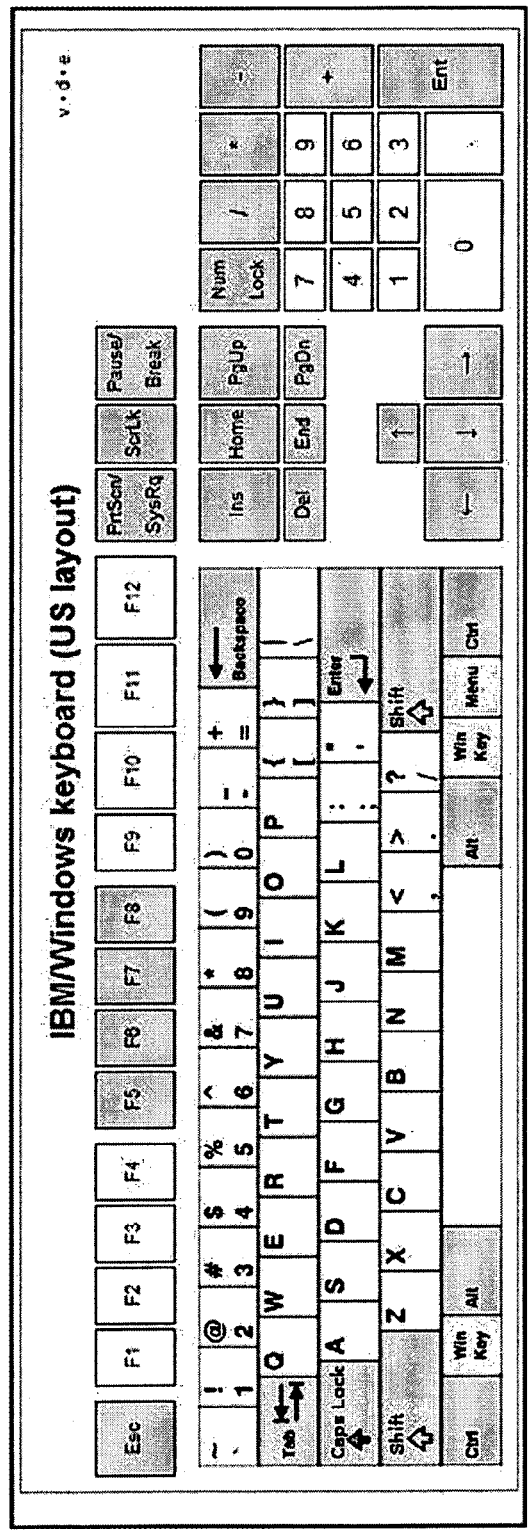
FIG. 1 shows an existing IBMW Keyboard.
Figure 2:
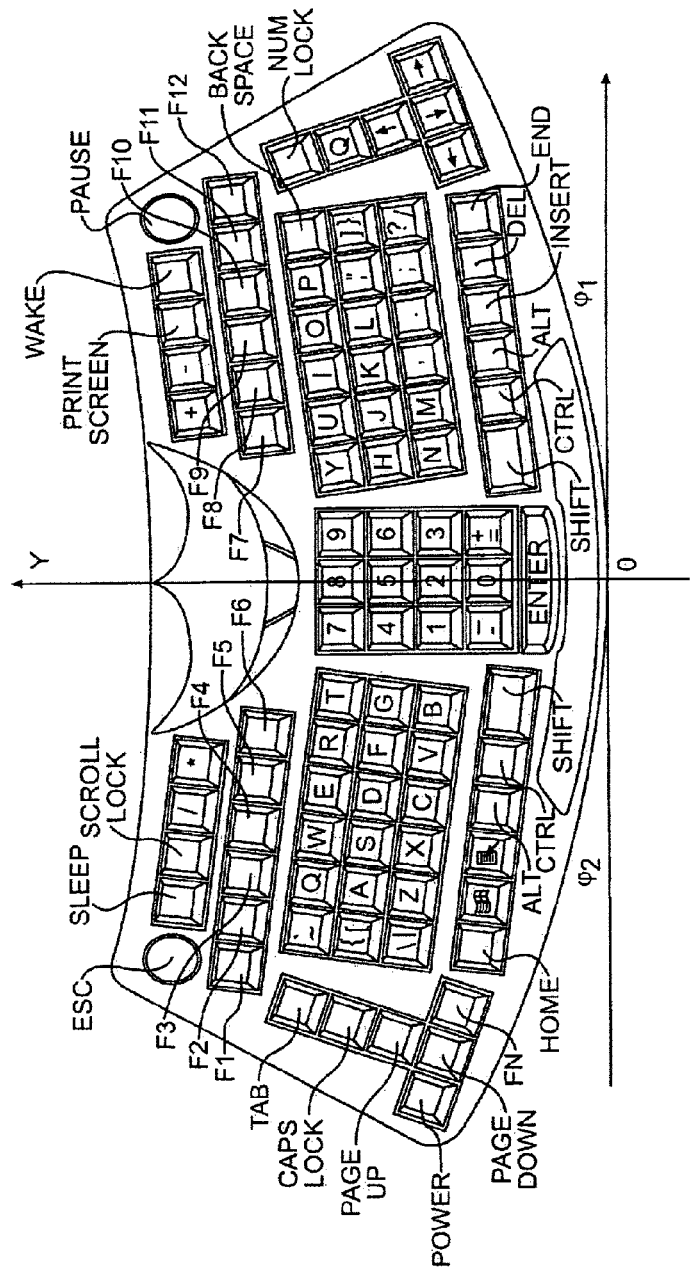
FIG. 2 shows a computer keyboard of prior art; Yan Computer Keyboard (U.S. Pat. No. 6,241,406).

Skilled artisans will appreciate that elements in the drawings are illustrated for simplicity and have not necessarily been drawn to scale. For example, the dimensions of some of the elements in the drawings may be exaggerated relative to other elements to help to improve understanding of embodiments of the present invention.

DETAILED DESCRIPTION OF THE PRESENT INVENTION

Accordingly, the present invention provides a data entry device which meets the requirements of all users including but not limited to word processors, data entry personnel, programmers, internet users and garners. The Data Entry Device (DED) of the present invention is technically feasible and also commercially viable. The construction of the DED is easy to understand, easy to learn, easy to use, enables increase in the speed of data entry, is designed to reduce errors and minimises the possibility of medical problems in prolonged usage.

In an embodiment of the present invention, the DED is a keyboard. Preferably, the DED of the present invention is a keyboard integrated with a pointing device. The DED of the present invention is usable with all the existing computers or other devices without the need for making any changes in the existing software or hardware.

In another embodiment of the present invention, all the keys of an IBMW Keyboard have been formed into groups on the basis of their function. Broadly there are three groups and further subgroups as shown in Table 1 below. All these keys, except those discontinued being unnecessary will find place on the DED. Keys marked with have not been shown on the DED of the present invention as they will be located in the free space area and is left to the manufacturer.

TABLE 1

| Groups | | |
|---|---|---|
| Character Keys | Operation Keys | Technical Function Keys |
| Sub-groups | | |
| Alphabet Keys | Modifier Keys | F Keys |
| Space Key | Navigation Keys | Function Key |
| Punctuation Keys | Edit Keys | Number Lock/Caps Lock/Scroll Lock |
| Symbol Keys | Escape Key | System Request and Print Screen Key |
| Numeral Keys | Enter Key | Break and Pause Key |
| Mathematical Operator Keys | | Power Management Keys* |
| Special keys for other languages, where required | Windows Key | Internet Keys* |
| | Context Menu Key | Multimedia Keys* |
| | Dead Keys (Compose Key) | Special Keys for Specific Purposes* |

Note:
Keys marked with an asterisk are not shown on the DED of the present invention as they will be in the free space in the top area.

In a preferred embodiment, the following factors are considered for allotting different characters to keys in order to construct the DED according to the present invention:
- (a) Order of Ease of Use (OEU) of Keys.
- (b) Frequency of Occurrence of a Character in the Environment (CF).
- (c) Ideal Finger Workload (IFW) of each Finger.

The following paragraphs describe the afore-mentioned factors:

Order of Ease of Use (OEU) of Keys:

The most easily used key is allotted the most frequently occurring character and so on. To enable this, an OEU of keys has been worked out for each group of keys separately and the OEU for each group is explained in detail in a later part of the description.

Frequency of Occurrence of a Character in the Environment (CF):

This is the estimated frequency of occurrence of each character (excluding the 'space') in the environment. Frequency of occurrence of a character in the environment can be determined by any suitable method. The characters considered here are only those available on an English language IBMW Keypad.

In an embodiment of the present invention, the frequency of occurrence of characters is determined from four representative documents selected from the group comprising but not limited to (i) Microsoft C+ Language Specification Document, (ii) Microsoft Encarta Entry on Africa of 2004, (iii) Wikipedia Entry on the Tiger of 2008, and (iv) Top One Thousand English Words. The following steps can be performed for calculating the frequency of occurrence of characters:—
- (a) Calculating the mean percentage occurrence of all types of key strokes in typing the four documents.
- (b) Calculating the mean percentage occurrence of all types of key strokes within their subgroup in typing the four documents.
- (c) Calculating the mean percentage occurrence of only the characters in the four documents, i.e., excluding the non-character keys and the space.

The mean percentage occurrence of the characters determined in step (c) is considered as the frequency of occurrence of that character in the environment excluding spaces in accordance with an embodiment of the present invention. Table 2 shows the frequency of occurrence of each character in the environment calculated according to an embodiment of the present invention.

TABLE 2

| Ser No<br>a | Characters in order of CF<br>B | CF in % age<br>c |
|---|---|---|
| | Alphabets | |
| 1 | e | 12.42 |
| 2 | t | 8.38 |
| 3 | a | 7.97 |
| 4 | i | 7.14 |
| 5 | n | 6.95 |
| 6 | r | 6.61 |
| 7 | o | 6.54 |
| 8 | s | 6.44 |
| 9 | l | 4.17 |
| 10 | h | 3.82 |
| 11 | d | 3.65 |
| 12 | c | 3.30 |
| 13 | u | 2.47 |
| 14 | m | 2.35 |
| 15 | p | 2.27 |
| 16 | g | 2.18 |
| 17 | f | 2.12 |
| 18 | y | 1.52 |
| 19 | b | 1.48 |
| 20 | w | 1.42 |
| 21 | v | 1.00 |
| 22 | k | 0.64 |
| 23 | x | 0.33 |
| 24 | q | 0.10 |
| 25 | j | 0.10 |
| 26 | z | 0.10 |
| 27 | Total Numerals | 95.47 |
| 29 | 0 | 0.12 |
| 29 | 1 | 0.12 |
| 30 | 2 | 0.12 |
| 31 | 3 | 0.12 |
| 32 | 4 | 0.12 |
| 33 | 5 | 0.12 |
| 34 | 6 | 0.12 |
| 35 | 7 | 0.12 |
| 36 | 8 | 0.12 |
| 37 | 9 | 0.12 |
| 38 | Total | 1.20 |

| Ser No<br>a | Characters in order of CF<br>b | CF in % age<br>C |
|---|---|---|
| | Mathematical Operators | |
| 39 | − | 0.28 |
| 40 | ( | 0.23 |
| 41 | ) | 0.23 |
| 42 | { | 0.08 |
| 43 | } | 0.08 |
| 44 | = | 0.07 |
| 45 | / i.e. ÷ | 0.07 |
| 46 | < | 0.03 |
| 47 | + | 0.03 |
| 48 | [ | 0.03 |
| 49 | ] | 0.03 |
| 50 | * i.e. × | 0.02 |
| 51 | > | 0.00 |
| 52 | Total Punctuations | 1.18 |
| 53 | , | 0.83 |
| 54 | . | 0.76 |
| 55 | ' | 0.17 |
| 56 | ; | 0.09 |
| 57 | " | 0.08 |
| 58 | : | 0.08 |
| 59 | - | 0.06 |
| 60 | \| | 0.01 |
| 61 | ! | 0.00 |
| 62 | \ | 0.00 |
| 63 | _ | 0.00 |
| 64 | ? | 0.00 |
| 65 | / | 0.00 |
| 66 | ` | 0.00 |
| 67 | ~ | 0.00 |
| 68 | Total Symbols | 2.08 |
| 69 | # | 0.05 |
| 70 | & | 0.02 |
| 71 | @ | 0.00 |
| 72 | $ | 0.00 |
| 73 | % | 0.00 |
| 74 | ^ | 0.00 |
| 75 | * | 0.00 |
| 76 | Total | 0.07 |
| 77 | Grand Total | 100.00 |

Ideal Finger Workload (IFW) of Each Finger:

Each of the fingers of a hand has an ideal capacity to do work in relation to other fingers. Therefore, the workload allotted to each finger should be based on their capacity to do work. For instance, the index finger is far easier to use than the little finger and is also capable of doing work more conveniently. The IFW is the total workload (in percentage) that each finger should ideally be allotted, and is based on a factor which shall be hereinafter referred to as Ergonomic Factor of Fingers (EFF). For a finger, if the EFF is higher, then more workload can be allotted to that finger and so on. When workload is allotted to all fingers based on the factor described above, all the fingers will function at their optimum efficiency.

The Ergonomic Factor of Fingers (EFF) is defined as the relative capacity of each finger in relation to other fingers to perform functions efficiently. For instance, the Index Finger will have a higher EFF than the Little Finger. This implies that the Index Finger can do more work than the Little Finger without loss of relative efficiency. Therefore, the allocation of work to fingers should be based on EFF. EFF for the Index Finger is taken as '1' and the values for others are relative to this. EFF for the thumbs are not calculated as they will be tasked independent of the rest of the fingers.

According to an embodiment of the present invention, the Ergonomic Factor of Fingers (EFF) is calculated on the basis of 'Strength of Each Finger' (SEF) and Convenience Index (CI).

Strength of Each Finger (SEF) is a measure of the maximum amount of force that a finger can apply on to the keyboard while placed in the normal typing attitude. This can be measured in a simple manner by using a kitchen scale, whose top is placed at the same level as the table top and pressure applied to the top of the scale by each finger, while the hand is kept on the table in the normal typing position. The strength of the finger in the typing attitude is one of the measures of its capacity to do work, the stronger the finger the more work that can be allotted to it. According to an embodiment of the present invention the SEF has been measured for an average right handed person and has been tabulated in Table 3 below. It must be noted that what is important is the relative strength between fingers and not the absolute strength recorded.

TABLE 3

| Finger | Strength of Each Finger (SEF) (Kg) | | Mean SEF (Kg) |
|---|---|---|---|
| | Left Hand | Right Hand | |
| Index | 4.4 | 4.7 | 4.55 |
| Middle | 2.8 | 3.4 | 3.10 |
| Ring | 2.5 | 2.6 | 2.55 |
| Little | 1.6 | 2.2 | 1.90 |
| Total | 11.3 | 12.9 | |

Convenience Index (CI) is a measure of control that a user can apply on each of his fingers while performing tasks and the relative ease with which he can perform tasks with them. The CIs of fingers are broad indicative figures which will give a fair idea of relative convenience of use of fingers. It would also vary slightly from individual to individual and there is no exact measurable value for this. The Index Finger is the one on which maximum control can be applied. Therefore, CI of the Index Finger is also taken as '1' and then values for other fingers are allotted in relation to the Index Finger. Table 4 below shows the Convenience Index of each finger; as assessed for an average person according to an embodiment of the present invention.

TABLE 4

| Finger | Convenience Index |
|---|---|
| Index | 1.0 |
| Middle | 0.8 |
| Ring | 0.7 |
| Little | 0.4 |

Both the above factors, i.e. SEF and CI, are measures that give us a fair idea of the relative capacity of each finger on two separate aspects. The EFF for each finger then is a product of the above two values, i.e. mean SEF and CI, for the respective fingers and is expressed as a ratio in relation to the Index Finger's value taken as '1'.

Therefore, the $EFF$ of a Finger =

$$\frac{(\text{Mean } SEF \times CI) \text{ of that Finger}}{(\text{Mean } SEF \times CI) \text{ of the Index Finger (highest value)}}$$

As explained in earlier paragraphs that the IFW for a finger is directly proportional to the EFF of that finger. The IFW in percentage of a finger is then equal to EFF of that finger expressed as a percentage of the sum of all EFF.

$$\text{Thus, } IFW\ (\%) = \frac{EFF \text{ of that finger}}{\text{Sum of all } EFF} \times 100.$$

According to embodiment of the present invention the Finger Workload (FW) of the weaker hand can be calculated as ratio of sum of the SEFs of weaker hand to the sum of the SEFs of the stronger hand. For a right handed person the left hand is weaker. Thus the EFF of the left hand would be less than the right hand.

$$\text{Left Hand } FW \text{ Ratio} = \frac{\text{Sum of left Hand } SEF}{\text{Sum of Right Hand } SEF}$$

$$= \frac{11.3 \text{ Kg}}{12.9 \text{ Kg}}$$

$$= 0.876$$

Left Hand $FW$ Ratio expressed as a percentage of Right Hand $FW$ =

$$0.876 \times 100 \approx 88\%$$

According to an embodiment of the present invention the IFW is determined as indicated in Table 5 below:—

TABLE 5

| Ser No | Finger | Strength of Each Finger (SEF) (Kg) | | Mean SEF (Kg) | CI | Mean SEF × CI (e × f) | EFF | IFW (both hands) % | IFW (each hand) % | |
|---|---|---|---|---|---|---|---|---|---|---|
| | | Left Hand | Right Hand | | | | | | Left Hand | Right Hand |
| a | b | c | d | e | f | g | h | j | k | L |
| 1. | Index | 4.4 | 4.7 | 4.55 | 1.0 | 4.55 | 1.00 | 47 | 22.00 | 25.00 |
| 2. | Middle | 2.8 | 3.4 | 3.10 | 0.8 | 2.48 | 0.55 | 26 | 12.17 | 13.83 |
| 3. | Ring | 2.5 | 2.6 | 2.55 | 0.7 | 1.79 | 0.39 | 19 | 8.90 | 10.10 |
| 4. | Little | 1.6 | 2.2 | 1.90 | 0.4 | 0.76 | 0.17 | 08 | 3.74 | 4.26 |
| | Total | 11.3 | 12.9 | | | 9.58 | 2.11 | 100 | 46.81 | 53.19 |

Note:
The left hand Ideal Workload is 88% of the right hand.

While designing a keyboard and pointing device combination, the most important aspect to be considered is their ergonomic integration with the hands of the user. The device must provide the user with ease of use, comfort and safety while using them for prolonged periods. This entails two aspects, first is the positioning of the hands and second; the movement of the hands while using the keyboard and pointing device.

Standard Resting Position of the Hands (SRP):

The hands when placed on top of a table to use a keyboard adopt a natural resting position. Depending on the keyboard design, the palms rest either on the table or on the keyboard. The fingers are flexed in their natural relaxed attitude and rest on the main part of the keyboard where the alphabets are placed. This position is referred to as 'Standard Resting Position (SRP)' of the hands.

HOA and EHOA:

An area on the keyboard where the fingers can reach comfortably without having to move the hands from the SRP is referred to as the 'Hand Operating Area (HOA)'.

A few keys function keys namely the F1, F2, F11, F12, System Request and Pause Break Keys which are rarely used may fall beyond the HOA depending on the size of the users hands. To reach these keys the palms may have to reach about 2 cm forward; however no shifting of the hands will be required. This area is being referred to as the 'Extended Hand Operating Area (EHOA)'.

Figure 16:
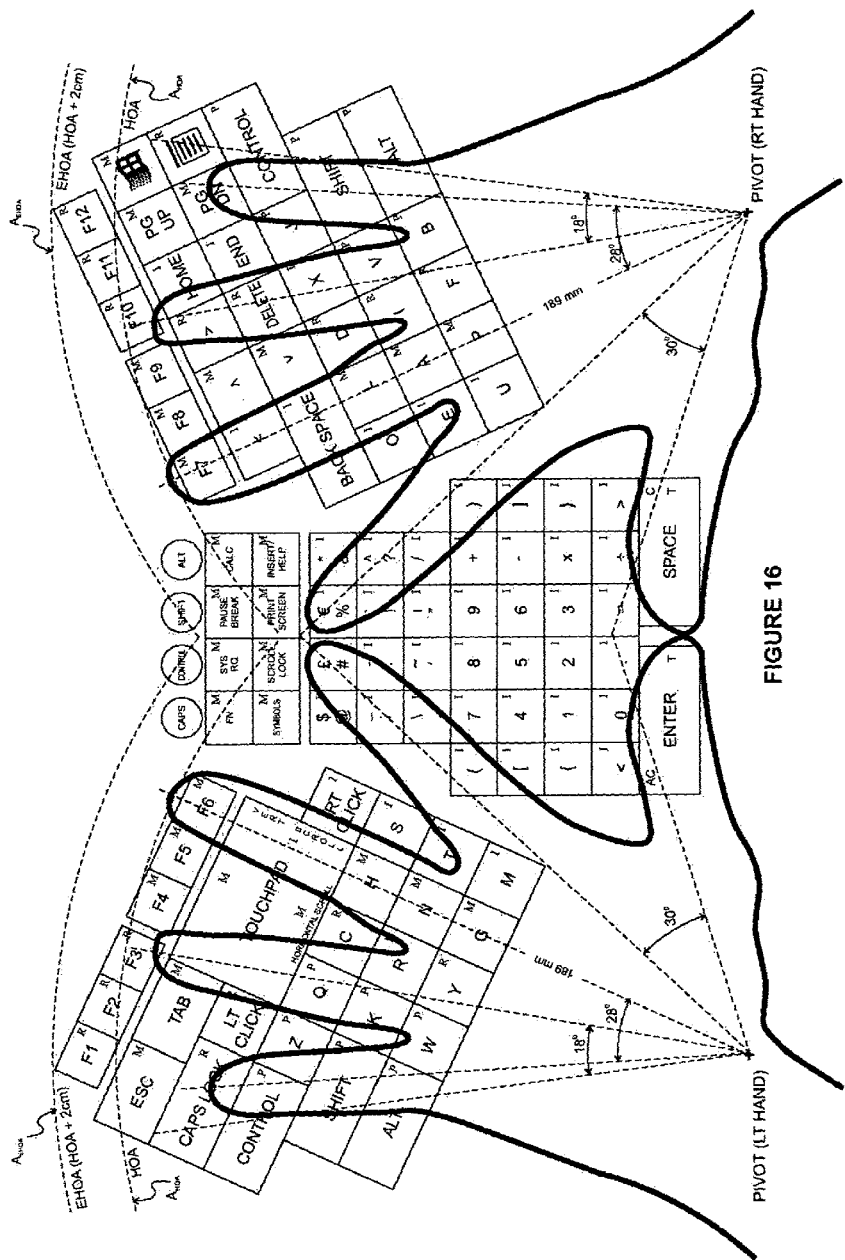
FIG. 16 is an exemplary illustration of the DED according to an embodiment of the present invention with the outline of the hands superimposed on the DED.

The limits of the HOA cannot be defined as it would depend on each individual users reach. For illustrative purpose the HOA and EHOA are shown by arcs for a normal size hand in FIG. 16. A normal size hand is taken as one with a length of 189 mm measured from the pivot to the tip of the middle finger as shown in FIG. 16.

Embodiment

Accordingly, the present invention provides a data entry device for enabling a user to input data, said data entry device comprising plurality of keys and a pointing device located on a keyboard such that all keys and pointing device can be operated without relocating the hands from initial resting position of hands on the keyboard and the said plurality of keys and pointing device being located so as to distribute workload to the left and right hands according to their respective capacities to do work in relation to each other and further so as to distribute the workload on each finger and thumb also according to their relative capacity to do work; said plurality of keys are divided into one or more groups in which at least one group comprises keys being located on the keyboard based on frequency of occurrence of characters in the environment and order of ease of use of keys.

In an embodiment of the present invention the said one or more groups comprise character key group or operational key group or technical function key group or combinations thereof.

In an embodiment of the present invention the character key group is divided in to one or more sub-groups comprising Alphabet keys, space key, punctuation key, symbol keys, numerical keys and/or mathematical operator keys or combinations thereof.

In another embodiment of the present invention the operation keys are selected from Modifier keys, Navigation keys, Edit keys, Escape key, Enter key, Mathematical operator keys, Windows key and Context Menu key.

In still another embodiment of the present invention in at least one of the sub-groups of character keys, keys are located based on frequency of occurrence of characters in the environment and order of ease of use of keys such that key constructed with character having highest frequency of occurrence is placed at the location with highest overall order of ease of use and so on in descending order.

Accordingly, the present invention also provides a Data Entry Device (DED) for enabling a user to input data using one or more keys located in plurality of areas, said device comprising:

a first area and a second area symmetrical to the first area; each of the said first and the second area comprising an upper row of five alphabet keys, a middle row of four alphabet keys and a bottom row of four alphabet keys; each of the first and second area is provided with three modifier keys, one each on the outer extremity of the upper, middle and bottom row of the first and second areas;

a third area disposed in between the first and the second area, comprising four rows of keys with six mathematical keys in each row so as to define a Mathematical Keypad and 'Enter' and 'Space' keys disposed below the Mathematical Keypad;

a fourth area located immediately above the third area; the said fourth area comprising three rows of keys with each row being provided with four punctuation/symbol keys;

a fifth area located above the first area, the said fifth area comprising a 'Caps Lock' Key located at extreme left position in the fifth area and above the modifier key of the upper row of the first area; and an 'Escape' Key and a 'Tab' Key located at the extreme left position in the fifth area and above the said 'Caps Lock' Key;

a sixth area located above the second area, the said sixth area comprising two rows provided with six keys in each row comprising Navigation Keys and Edit Keys;

a seventh area and an eighth area located above the fifth area and the sixth area respectively; each of the seventh area and the eighth area are provided with a row of six F keys each;

a ninth area located above the fourth area and disposed between the fifth and seventh area on the left and the sixth and eighth areas on the right and; the said ninth area comprising two rows of keys with each row provided with four keys.

In an embodiment of the present invention said fifth area comprising a pointing device with the 'Escape' key and the 'Tab' key being located on the left side of the said pointing device.

In another embodiment of the present invention the first, fifth and seventh areas forms a left wing of the Data Entry Device, and the second, sixth and eighth areas forms a right wing of the Data Entry Device.

In still another embodiment of the present invention the said left wing and the right wing are placed at a predetermined angular position equally with respect to the third, fourth and ninth area so as to form a shallow 'V' construction of the Data Entry Device.

In yet another embodiment of the present invention the keys disposed in the first, the second and so on up to ninth areas are constructed with two or more colours so as to indicate clear distinction between the areas.

In a further embodiment of the present invention in the first area and in the second area, the alphabet keys are so disposed that the key of the letter of alphabet with the highest Frequency of Occurrence (CF) is placed at the location with the highest overall Order of Ease of Use (OEU) and so on in descending order.

In a further more embodiment of the present invention the three modifier keys is selected from a group comprising 'Control', 'Shift' and 'Alt' Keys.

In one more embodiment of the present invention the upper, middle and bottom rows of keys of the first and the second area comprises 'Control', 'Shift' and 'Alt' Keys respectively.

In an embodiment of the present invention the said Mathematical Keypad provided with four rows with six keys in each row thereby forming six columns in each row, said keypad comprising:
a first column and a sixth column from the left of the Mathematical Keypad comprising open small bracket (left parenthesis) key and close small bracket (right parenthesis) key; open middle bracket (left square bracket) key and close middle bracket (right square bracket) key; open large bracket (left curly bracket) key and close large bracket (right curly bracket) key and 'lesser than' and 'greater than 'signs' keys; respectively;
a second column, a third column and a fourth column comprising number keys, 'decimal (.)' key and 'equal to (=)' key;
a fifth column having the mathematical operator keys comprising 'addition (+)', 'subtraction (−)', 'multiplication (×)' and 'division (÷)' keys.

In another embodiment of the present invention the first column from the left of the Mathematical Keypad comprises the 'open small bracket', the 'open middle bracket', the 'open large bracket' and the 'lesser than sign' keys and the sixth column comprising the 'close small bracket', the 'close middle bracket', the 'close large bracket' and the 'greater than sign' keys.

In still another embodiment of the present invention the third area comprises a 'Space' Key and an 'Enter' Key disposed in a row below the Mathematical Keypad with a predetermined gap between the 'Space' Key and the 'Enter' Key.

In yet another embodiment of the present invention the width of the 'Space' Key and the 'Enter' Key is two and a half times the width of a Standard Key.

In a further embodiment of the present invention in the fourth area, the Punctuation and Symbol Keys are disposed in three rows and four columns.

In a further more embodiment of the present invention in the fourth area, each of the keys is constructed with two punctuations/symbols on it and are to be operated directly or in conjunction with the 'Shift' Key.

In one more embodiment of the present invention in the fourth area, each of the punctuations and/or symbols keys are placed on the Punctuation and Symbols Keypad according to the CF and similarity of type of punctuations and/or symbols and the OEU of punctuation and symbol key locations.

In an embodiment of the present invention in the fourth area, the Punctuation Keypad comprises a 'Full Stop (.)' Key and a 'Hyphen (-)' Key.

In another embodiment of the present invention the Pointing Device is selected from the group comprising a scrolling ball, joy stick and pointing stick.

In still another embodiment of the present invention the pointing device is a touchpad with a left-click key and a right-click key being disposed on left and right sides of the touchpad respectively.

In yet another embodiment of the present invention in the fifth area, the 'Escape' Key and the 'Tab' Key are located to the left of the Touchpad and above the 'Caps Lock' Key and the 'Left-Click' Key and there is no other key located above the 'Right-Click' Key.

In a further embodiment of the present invention in the sixth area, the Navigation Keys are selected from the group comprising an 'Up Arrow' Key, a 'Down Arrow' Key, a 'Left Arrow' Key, a 'Right Arrow' Key, a 'Page-Up' Key, a 'Page Down' Key, a 'Home' Key, and an 'End' Key and further wherein the Edit Keys are selected from the group comprising a 'Backspace' Key and a 'Delete' Key.

In further more embodiment of the present invention the 'Up Arrow' Key, the 'Left Arrow' Key and the 'Right Arrow' Keys are provided in upper row and the 'Down Arrow' Key is located in lower row so that the arrow keys form a T shape and are operable by the Index, Middle and Ring Fingers.

In one more embodiment of the present invention the keys located in the sixth area comprise a 'Home' Key, 'End' Key, 'Page-Up' Key, 'Page-Down' Key, 'Windows' Key and 'Context Menu' Key.

In an embodiment of the present invention the 'Home' Key and the 'End' Key are located one below the other in one column and the 'Page-Up' Key and the 'Page-Down' Key are located one below the other in the other column.

In another embodiment of the present invention the 'Backspace' Key is located to the left of the Down Arrow Key and the 'Delete' Key is located to the right of the Down Arrow Key.

In still another embodiment of the present invention the Windows Key and the Context Menu Key are located right of the Navigation Keys.

In yet another embodiment of the present invention in the seventh area, the 'F' Keys comprising keys F1, F2, F3, F4, F5 and F6 are disposed; and in the eighth area, the 'F' Keys comprising F7, F8, F9, F10, F11 and F12 are disposed.

In a further embodiment of the present invention in the ninth area, the two rows comprise of keys selected from the group comprising a 'Function' Key, a 'System Request' Key, a 'Pause/Break' Key, a 'Calculator Mode' Key, a 'Symbols' Key, a 'Scroll Lock' Key, a 'Print Screen' Key and a 'Insert/Help' Key.

In a further more embodiment of the present invention in the ninth area, plurality of indicators have been provided for indicating operation of one or more keys selected from the group comprising the 'Caps Lock', 'Control', 'Shift' and 'Alt' Keys.

The present invention also provides an Alphabet Keypad for a Data Entry Device, the said keypad comprising a left half and a right half symmetrical to the left half; each of the left and the right half comprising an upper row of five keys, a middle row of four keys and bottom row of four keys; such that the keys of the three rows are aligned one below the other starting with the innermost keys of the three rows such that the fifth key of the upper row on both halves is on the outer extreme and have no alphabet key below the said fifth key.

In an embodiment of the present invention the keys of letters of the alphabet having highest CF is placed at the location with highest overall OEU and so on in descending order.

In another embodiment of the present invention, in the Alphabet keypad, the innermost three keys of the middle row and the outermost key of the bottom row on each half are designated as Home Keys of Index, Middle, Ring and Little Fingers of each hand respectively.

In still another embodiment of the present invention, in the Alphabet keypad, the OEU of keys for each of the three keys to be used by the index, middle and ring finger of each hand begins from the respective Home Keys; followed by the key above their Home Key in the upper row and followed by the key below their Home Key in the bottom row and the OEU of keys for the four keys to be used by the little fingers of each hand is their Home Key in the bottom row; followed by the key above in the middle row above the Home Key; followed by the key above this key in the upper row and then followed by the outermost key in the upper row on both halves.

In another embodiment of the present invention the OEU of the 26 keys for the letters of the alphabet in descending order follows the sequence starting with the Home Keys of Index, Middle and Ring finger in that order for both hands on both halves of the Data Entry Device in the middle row of the Alphabet Keypad, followed by the three keys in the upper row located above the said Home Keys and in the same order, followed by the three keys in the bottom row located below the said Home Keys and in the same order, followed by Home Keys for the little fingers of both hands in the bottom row, followed by the keys for the little fingers in the middle row above the said Home Keys of the little fingers, followed by the keys of the little fingers in the upper row and then followed by the outermost keys of the little fingers in the upper row; provided that each key of the right hand takes a higher precedence than the corresponding key of the left hand such that the OEU alternates between the right and the left hand thus establishing the descending OEU for the 26 keys.

In still another embodiment of the present invention, the keys located in the upper row of the left half is provided with letter keys Z, Q, C, H, S and the keys in the upper row of the right half is provided with letter keys O, L, D, X, J; the middle row in the left half is provided with letter keys K, R, N, T and the middle row in the right half is comprising letter keys E, A, I, V; the bottom row in the left half is provided with letter keys W, Y, G, M and the bottom row in the right half is comprising letter keys U, P, F, B; in that order and all read from left to right.

In yet another embodiment of the present invention the keys located in the upper row of the first area is provided with letter keys Q, W, E, R, T and the upper row of the second area is provided with of letter keys Y, U, I, O, P; the middle row of the first area provided with letter keys S, D, F, G and the middle row of the second area provided with letter keys H, J, K, L; the bottom row of the first area provided with letter keys X, C, V, B and the bottom row of the second area provided with letter keys N, M, A, Z; in that order and all read from left to right.

In a further embodiment of the present invention the alphabet keys on the left hand side alphabet keypad in the first area can be laterally inverted and placed on the alphabet keypad in the second area on the right side and the alphabet keys on the right hand side alphabet keypad can be laterally inverted and placed on the alphabet keypad in the first area on the left side.

In a further more embodiment of the present invention the construction of the keys and pointing device in the fifth area can be laterally inverted and placed in the sixth area on the right side and the construction of keys in the sixth area can be laterally inverted and placed in the fifth area on the left side.

In another embodiment of the present invention the construction of keys on the left half are laterally inverted and placed in right half, and the construction of keys of the right half are laterally inverted and placed on the left half.

The present invention also provides a mathematical keypad for a Data Entry Device, said Mathematical Keypad comprising four rows of keys with each row comprises six keys thereby forming six columns in which:

a first column and a sixth column from the left comprising open small bracket (left parenthesis) key and close small bracket (right parenthesis) key; open middle bracket (left square bracket) key and close middle bracket (right square bracket) key; open large bracket (left curly bracket) key and close large bracket (right curly bracket) key and 'lesser than' and 'greater than' sign keys; respectively;

a second column, a third column and a fourth column comprising number keys, 'decimal (.)' key and 'equal to (=)' key;

a fifth column having the mathematical operator keys comprising 'addition (+)', 'subtraction (−)', 'multiplication (×)' and 'division (÷)' keys.

In an embodiment of the present invention, in the mathematical keypad the first column from the left comprises the 'open small bracket', the 'open middle bracket', the 'open large bracket' and the 'lesser than sign' keys and the sixth column comprising the 'close small bracket', the 'close middle bracket', the 'close large bracket' and the 'greater than sign' keys.

The present invention further provides a Punctuation keypad for enabling a user to input punctuations or symbols, said keypad comprises three rows and four columns in which the punctuations and/or symbols keys are placed according to frequency of occurrence (CF), similarity of type of punctuations and/or symbols, and order of ease of use (OEU) of punctuation and symbol key.

In an embodiment of the present invention, in the Punctuation keypad, each of the key is constructed with two punctuations/symbols on it and are to be operated directly or in conjunction with a 'Shift' Key.

In another embodiment of the present invention, in the Punctuation keypad, the keys comprise a 'Full Stop (.)' Key and a 'Hyphen (-)' Key.

Description of the DED:

The following paragraphs describe a data entry device of the present invention with reference to FIGS. 3 to 17. The present invention is described with reference to the figures and specific embodiments; this description is not meant to be construed in a limiting sense. Various alternate embodiments of the invention will become apparent to persons skilled in the art upon reference to the description of the invention. It is therefore contemplated that such alternative embodiments form part of the present invention.

Figure 3:
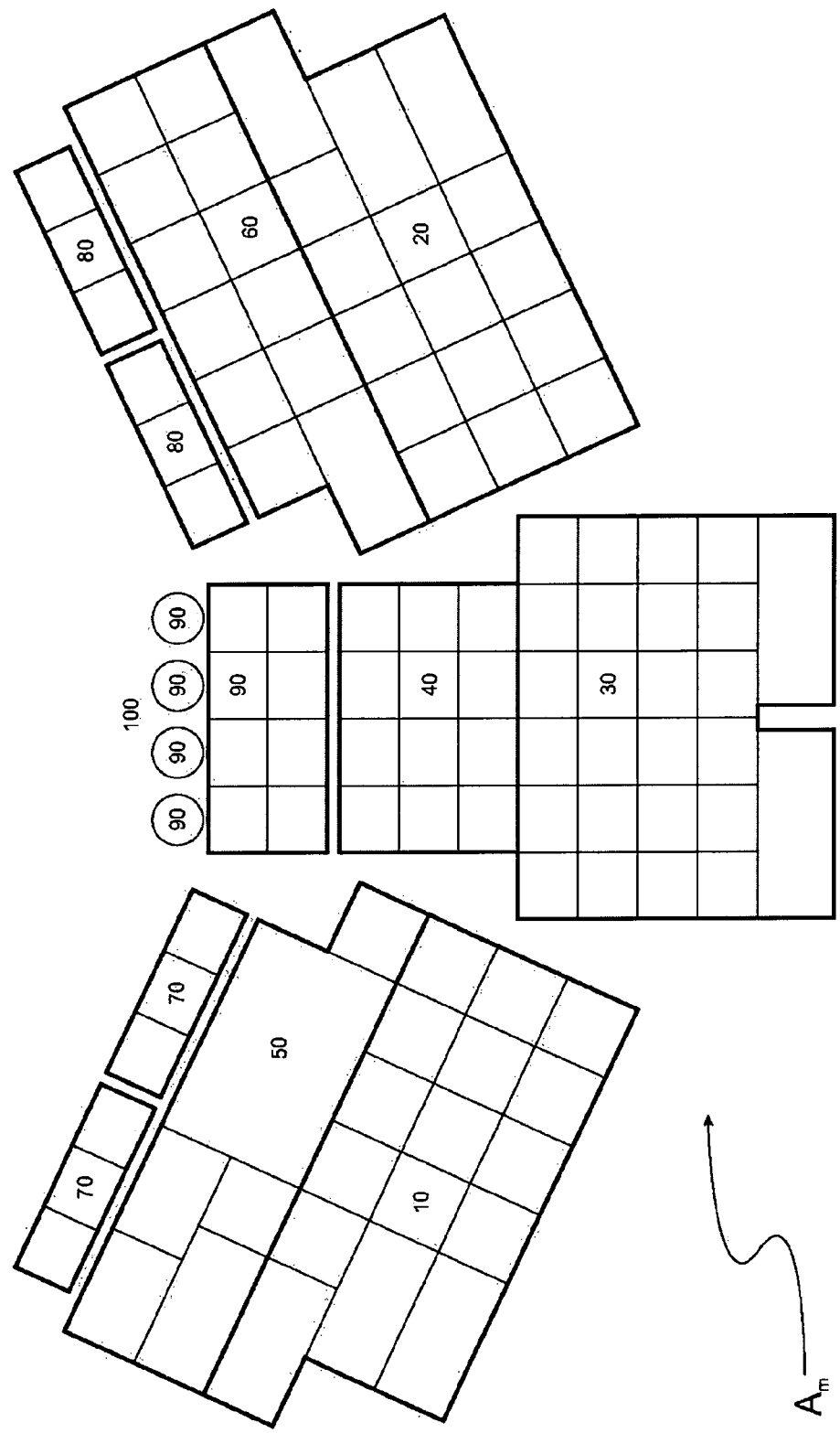
FIG. 3 is an exemplary illustration of the DED showing the ten areas and grouping of keys according to an embodiment of the present invention.

As shown in FIG. 3, the DED comprises a Main Area (Am) which is the total area of the DED; the said Main Area comprises a first area which is Lower Left Area (10), a second area which is Lower Right Area (20), a third area which is Lower Centre Area (30), a fourth area which is Middle Centre Area (40), a fifth area which is Middle Left Area (50), a sixth area which is Middle Right Area (60), a seventh area which is Top Left Area (70), an eighth area which is Top Right Area (80), a ninth area which is Top Centre Area (90), and a Free Space Area (100) on the top; the said first area and second area comprises Alphabet Keys and Modifier Keys; the said third area comprises Mathematical Keypad, 'Enter' Key and 'Space' Key; the said fourth area comprises Punctuations and Symbols Keys; the said fifth area comprises 'Escape', 'Tab', 'Caps Lock' Keys and a place for pointing device; the said sixth area comprises Navigation (four Arrow, 'Page-Up' and 'Page-Down') Keys, Edit, 'Windows' and 'Context Menu' Keys; the said seventh area and eighth area comprises F Keys; the said ninth area comprises 'Function' Key (where required), 'Symbols' Key, 'Calculator Mode' Key (when provided), 'Scroll Lock' Key, 'Pause/Break' Key, 'Print Screen' Key, 'System Request' Key and indicators for 'Caps Lock', 'Control', 'Shift' and 'Alt' Keys; the said Free Space Area can comprise Power Management, Internet, Multimedia and any other Special Keys, Knobs, Dials etc.

Figure 4:
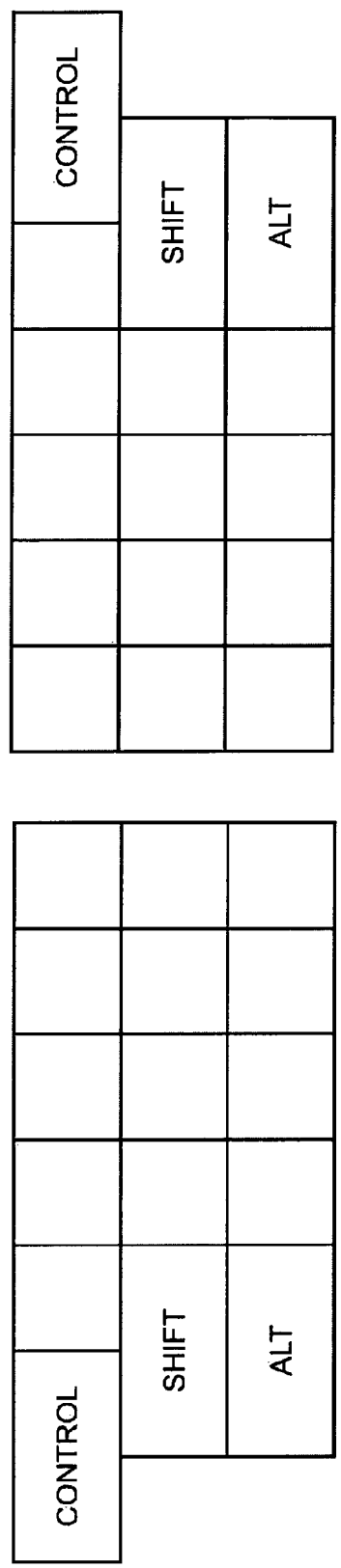
FIG. 4 illustrates a lower left area and lower right area of the DED according to an embodiment of the present invention.

According to an embodiment of the present invention referring to FIGS. 3 and 4, the DED comprises a first area and second area which are symmetrical to each other. Symmetrical to each other can be construed as symmetry in construction size and shape between the first area and the second area. The first area is provided with three rows of keys comprising Alphabet Keys and Modifier Keys i.e. an upper row with five alphabet keys, a middle row with four alphabet keys and a bottom row with four alphabet keys respectively. Similarly, the second area is provided with a three rows of keys i.e. an upper row with five alphabet keys, a middle row with four alphabet keys and a bottom row with four alphabet keys respectively. Each row of alphabet keys on both sides has one modifier key each on their outer extremity.

As shown in FIG. 3, the first area and the second area are located so as to divide the data entry device into left and right portions or vice versa. In other words, the first area and the second area form part of the left and right portion of the DED.

According to an embodiment of the present invention the 26 keys on first and second area are equally provided with 13 keys in each of the first and the second area so as to be operable by each hand. As shown in FIGS. 3, 4, 8 and 15, the Alphabet keys are disposed in three rows with five keys on the top row and four keys each on the middle and bottom rows of the first and the second area. There is no fourth row for the character keys above the Alphabets as in the IBMW Keyboard.

According to an embodiment of the present invention as shown in FIG. 4, the first area comprises three modifier keys, i.e. one each on the outer extremity of each of the upper, middle and bottom row. Similarly, three modifier keys are provided in the second area, i.e. one each on the outer extremity of each of the upper, middle and bottom row. The said modifier keys can be selected from 'Control', 'Shift' and 'Alt' Keys.

According to an embodiment of the present invention, the upper row, middle row, bottom row of the first and second area is provided with 'Control', 'Shift' and 'Alt' Keys respectively. In an embodiment of the present invention, in the first area and in the second area, the keys in the three rows are aligned one below the other starting with the inner most keys of the three rows such that the fifth key of the upper row is on the outer extremity and has no alphabet key below it. As can be observed from FIGS. 3 and 15, the construction of the first and the second area is identical and symmetric about the centre of the DED.

The DED of the present invention comprises a third area which is disposed between the first area and the second area. As shown in FIGS. 3, 9(a), 9(b) and 15 the third area comprises four rows of keys with each row provided with six keys. According to an embodiment of the present invention, keys on the third area are mathematical keys so as to form a mathematical keypad. The third area is provided with an 'Enter' Key and a 'Space' Key below the Mathematical Keypad according to an embodiment of the present invention.

Figure 15:
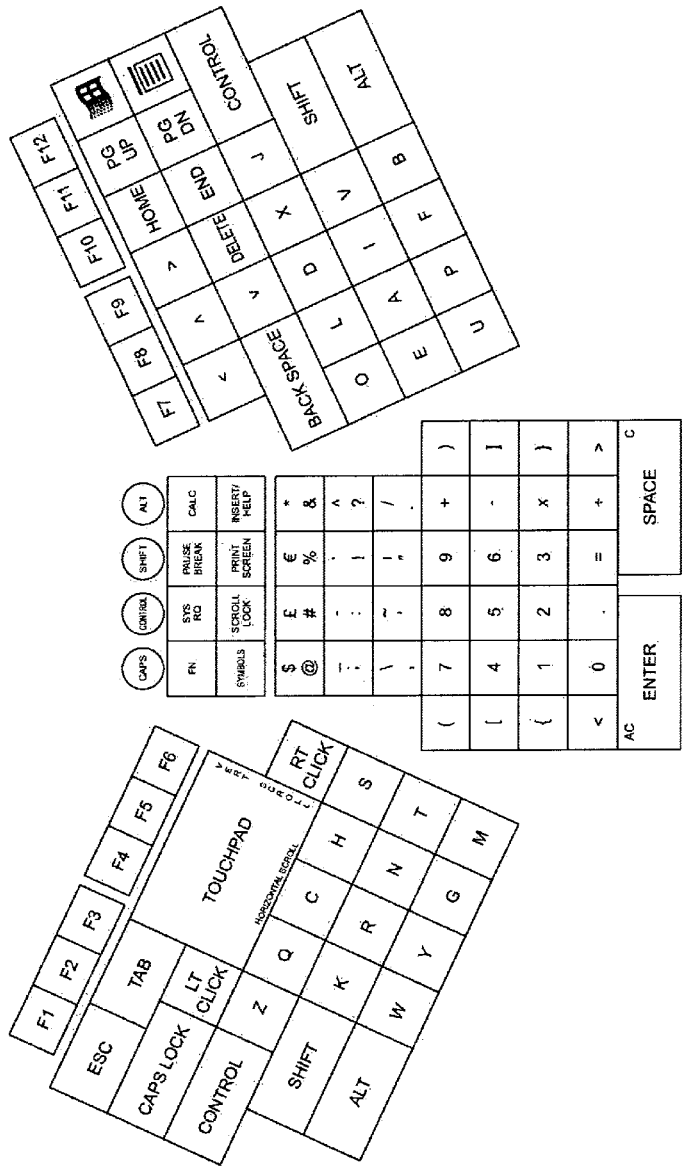
FIG. 15 shows a detailed diagram of the DED showing all keys according to an embodiment of the present invention.

The DED of the present invention comprises a fourth area located above the third area. As shown in FIGS. 3, 10 and 15 the fourth area comprises twelve keys which are disposed in three rows with four keys in each of the row. According to an embodiment of the present invention, the fourth area comprises punctuation keys, symbol keys, and punctuation cum symbol keys. In an embodiment of the present invention, the keys on the fourth area are aligned with intermediate four keys of top row of the third area (as shown in FIGS. 3 and 15).

Figure 11:
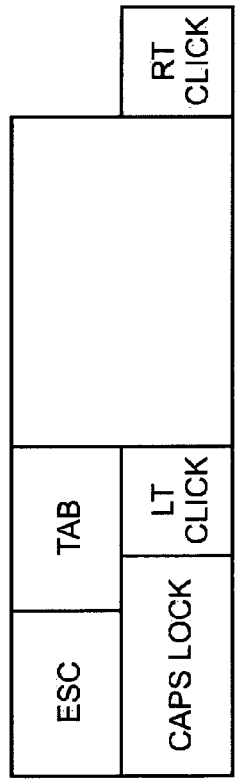
FIG. 11 shows the Middle Left Area of the DED according to an embodiment of the present invention.

The DED of the present invention comprises a fifth area which is located above the first area. According to an embodiment, a pointing device can be combined with the DED device of the present invention. As shown in FIGS. 3, 11 and 15 the fifth area comprises a pointing device and a Caps Lock Key located on extreme left of the fifth area. The Caps Lock Key is located above the modifier key on outer extremity of the upper row of the first area. The fifth area is also provided with an Escape Key and a Tab Key which is located on extreme left of the fifth area. According to an embodiment of the present invention, the Escape Key and the Tab Key can be located in a row which is above the Caps Lock Key and on left side of the pointing device. The pointing device can be selected from a group comprising but not limited to a touchpad with left and right-click keys, scrolling ball, joy stick, pointing stick etc. According to an embodiment the pointing device is a touchpad and is illustrated in FIGS. 3, 11 and 15.

Figure 12:
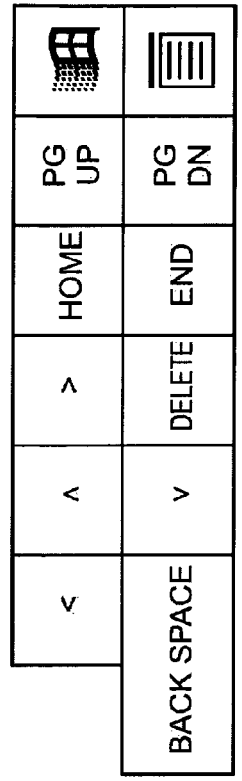
FIG. 12 shows the Middle Right Area of the DED according to an embodiment of the present invention.

The DED of present invention comprises a sixth area which is located above the second area. As shown in FIGS. 3, 12 and 15 the sixth area comprises keys in two rows one below the other, with each row provided with six keys. According to an embodiment of the present invention, the rows of keys in the sixth area are provided with Navigation keys, Edit Keys and related Keys. The Navigation keys can be selected from but not limited to an 'Up Arrow' Key, a 'Down Arrow' Key, a 'Left Arrow Key, a 'Right Arrow' Key, a 'Page-Up' Key, a 'Page-Down' Key, a 'Home' Key and an 'End' Key. The Edit Keys can be selected from but not limited to a 'Backspace' Key and a 'Delete' Key. According to an embodiment other related keys in this area can be the 'Windows' Key and the 'Context Menu' Key.

Figure 13:
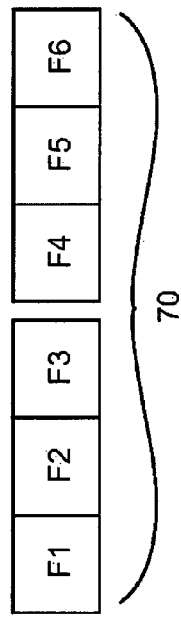
FIG. 13 shows the Top Left Area and the Top Right Area of the DED according to an embodiment of the present invention.

The DED of the present invention comprises a seventh area and an eighth area. As shown in FIGS. 3, 13 and 15 the seventh area is located above the fifth area and the eighth area is located above the sixth area. As can be observed from FIGS. 3, 13 and 15 each of the seventh area and the eighth area comprises six keys in a single row which makes the total number of keys in sixth and the seventh areas as twelve.

According to an embodiment of the present invention the keys disposed in the seventh and in the eighth area are 'F' Keys.

Figure 14:
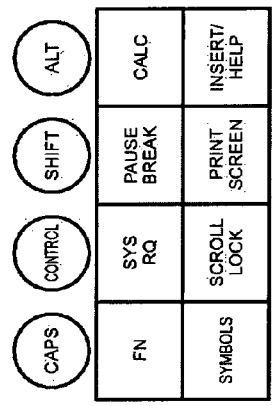
FIG. 14 shows the Top Centre Area of the DED according to an embodiment of the present invention.

The DED of the present invention comprises a ninth area which is disposed between the seventh area and the eighth area and above the fourth area. As shown in FIGS. 3, 14 and 15 the ninth area can comprise eight keys disposed in two rows one below the other; and with four keys in each row. According to an embodiment of the present invention one or more indicators can be provided for indicating the operation of one or more keys. As shown in FIGS. 3, 14 and 15 four indicators are disposed in a row above the keys in the ninth area.

Referring to FIGS. 3 and 15 the first, fifth and seventh areas form a left wing of the data entry device; and the second, sixth and eighth areas form a right wing of the data entry device.

In an embodiment of the present invention the construction of the DED can be laterally inverted about the centre with the option of a full lateral inversion or only selected areas or only selected keys as desired being laterally inverted to meet individual requirements such as for example left handed people or those who wish to have the pointing device on the right hand side.

In an embodiment of the present invention the alphabet keys on the left hand side alphabet keypad in the first area can be laterally inverted and placed on the alphabet keypad in the second area and the alphabet keys on the right hand side alphabet keypad can be laterally inverted and placed on the alphabet keypad in the first area. Such a keyboard may be suitable for left-handed people such that firstly; the workload on the hands is according to the capacity of the hands and secondly; all the vowels are available to them on the left side.

In another embodiment of the present invention the construction of the keys and pointing device in the fifth area can be laterally inverted and placed in the sixth area on the right side and the construction of keys in the sixth area can be laterally inverted and placed in the fifth area on the left side. Such a keyboard may be suitable for left-handed people and those who wish to use the pointing device with the right hand. This will enable use of the pointing device with the right hand and navigation, edit and other keys with the left hand.

Figure 17:
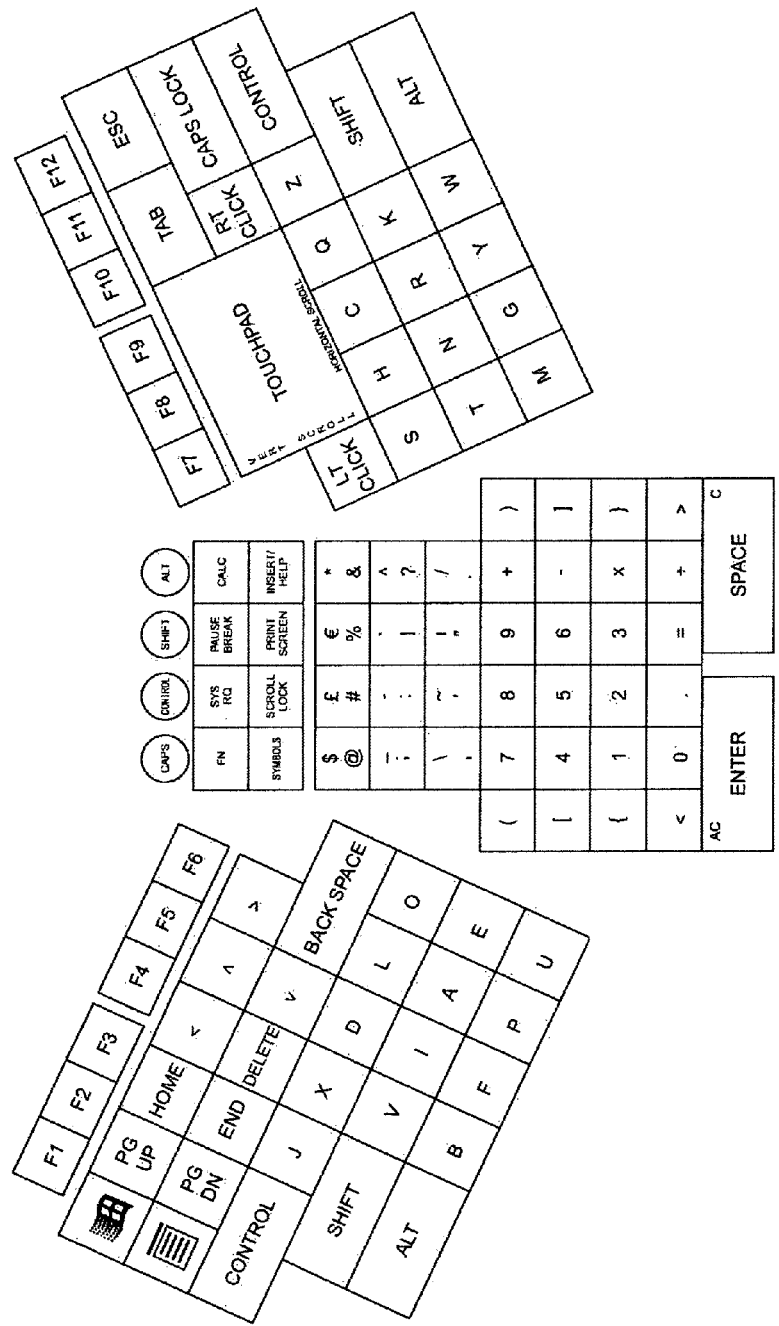
FIG. 17 illustrate the DED of the present invention in which lower and middle areas are laterally inverted in accordance of an embodiment.

FIG. 17 shows the DED of the present invention according to an embodiment of the present invention. As shown in FIG. 17, first area and fifth area are laterally inverted and placed in the second area and in the sixth area respectively on the right side. Also, the second area and the sixth area are laterally inverted and placed in the first area and in the fifth area respectively in the left side.

The DED of the present invention comprises a tenth area which is disposed above the seventh, eighth and ninth areas. As shown in FIGS. 3 and 15 it is a free space to accommodate additional keys selected from but not limited to keys for power management, internet, multi-media and any other special keys, knobs, dials etc.

As shown in FIG. 3, the left wing and the right wing of the DED are placed at a predetermined angular position with respect to the third, fourth and ninth areas so as form a shallow 'V' construction. In an embodiment of the present invention the DED has a shallow 'V' construction, with the left and the right wings both making an angle of 25 degrees each to the lateral horizontal line running parallel to the user. The shallow 'V' construction ensures that the hands are able to rest on the data entry device in their natural posture so as to function with minimum discomfort over prolonged periods.

It can be clearly understood from the above description and the description referring to FIGS. 3 and 15 that the first area and the second area form a lower left area and a lower right area; the third area and the fourth area form a lower centre area, a middle centre area; the fifth area and the sixth area form a middle left area and a middle right area; the seventh area, the eighth area and the ninth area form a top left area, and a top right area, a top centre area respectively of the DED.

Alphabet Keypad (Part of First and Second Area):

The present invention also provides an Alphabet Keypad for the DED as shown in FIGS. 5 and 15. According to an embodiment of the present invention, the Alphabet Keypad comprises a left half and a right half which are symmetrical to each other. Each of the left half and the right half is provided with three rows of keys i.e. an upper row with five keys, a middle row with four keys and a bottom row with four keys. The keys in the three rows are aligned one below the other starting with the inner most keys of the three rows such that the fifth key of the upper row is on the outer extremity and has no alphabet key below it on both halves.

FIG. 5 shows three rows of keys disposed in the left half and the right half of the Alphabet Keypad according to an embodiment of the present invention.

The Home Keys are the keys on which the fingers tend to rest naturally when placed on the keyboard in the SRP. On the IBMW Keyboard all four Home Keys are considered to be on a single row i.e. on the middle row called the Home Row. However, the four fingers of the hand in their natural posture do not rest in a straight line; the little finger tends to be one row below. This aspect has been accounted for while nominating the Home Keys on the data entry device of the present invention. As shown in FIG. 5 (as shaded keys), in each half, the middle row has three Home Keys on which index, middle and ring fingers of the hands naturally rest respectively; and the bottom row has one Home Key on which the little fingers (i.e. pinkies) of the hands rest naturally. More particularly, in the present invention, the three keys starting from the inner most keys in the middle row of each half is designated as Home Keys for index middle and ring fingers respectively; similarly, the outermost key in the bottom row of each half is designated as Home Key for the little finger (pinkie).

According to an embodiment of the present invention all letters of the alphabet are allotted to the four fingers of both hands for typing. The OEU of these fingers is index, middle, ring and little fingers (pinkie). While the index, middle and ring finger are easy to use, the little fingers are relatively difficult to use and are therefore given lesser workload. The following aspects are considered while allocating letters to each finger according to an embodiment of the present invention:—

(a) The index, ring and middle fingers of both hands are allotted the most frequently occurring three letters each. Thus, making a total of 18 letters.

(b) The little fingers are allotted with letters after all the other three fingers of both hands have been allotted letters. Thus, four letters each are allotted to the little fingers making up the remaining eight.

(c) Between the same fingers of both hands the right finger would be easier to use than the corresponding left finger.

(d) The Home Keys of the three fingers in the order index, middle and ring are the most easy to use for each finger, then comes the keys above the Home Keys followed by the keys below the Home Keys for each finger for both the hands; then comes the Home Keys for the little fingers in the bottom row, then the key in middle row above the said Home Keys, then key in the upper row above this key and then the outer most key in the upper row.

(e) Between two fingers it is easier to use the Home Key of a finger (except of the little finger), than for any of the other fingers to use the second or third key allotted to it.

(f) Similarly it is considered easier to use the second key of a finger than the third key of a higher rated finger.

(g) The keys allotted to the little fingers including the Home Key come at the end in the OEU of keys.

Based on above aspects, an OEU for alphabet keys for use by each finger and an overall OEU for the 26 alphabet keys has been arrived at as shown in FIG. 5. Referring to FIG. 5, expressions 'I', 'M', 'R' and 'P' indicates Index Fingers, Middle Fingers, Ring Fingers and Little Fingers (Pinkies) respectively. While 'L' and 'R', refer to the Left Hand and the Right Hand respectively.

Referring to FIG. 5, the OEU of keys for each finger is as follows. For the Right Index Finger it is its Home Key denoted as RI1 followed by RI2 and then RI3. Similarly for the Left Index Finger it is LI1, LI2 and LI3 and so on for each finger of both hands. Thus the OEU for the Right Middle Finger is RM1, RM2, RM3 and the Left Middle Finger is LM1, LM2 and LM3. For the Right Ring Finger it is RR1, RR2 and RR3 and for the Left Ring Finger it is LR1, LR2 and LR3. For the Right Little Finger it is RP1, RP2, RP3 and RP4 and for the Left Little Finger it is LP1, LP2, LP3 and LP4.

The OEU of keys between the same two fingers of both hands for a right handed person is based on the fact that the right finger would be easier to use than the corresponding left finger. Thus the inter-se OEU of keys for a corresponding pair of keys of a pair fingers would be the right hand side key followed by the left hand side key. Thus for the Index Fingers it would be RI1 followed by LI1, then RI2 followed LI2, then RI3 followed by LI3 and similarly for all pairs of keys for the middle, ring and little fingers.

Referring to FIG. 5, thus overall OEU for all the 26 alphabet keys together for a right handed person would begin with the RI1 on the right half being the most easy to use key among all 26 keys followed by the second most easy to use key LI1 on the left half and so on. Accordingly the overall OEU for the 26 alphabet keys begins with the index, middle and ring fingers; first the Home Keys, then the keys above the Home Keys and then the keys below the Home Keys followed by the Pinkies where it would be Home Keys followed by the key above it in the middle row followed by the key above it on the top row and the followed by extreme outer key in the top row. Thus the overall OEU of the 26 alphabet keys (overall OEU is shown in brackets) follows the order RI1(1), LI1(2), RM1(3), LM1(4), RR1(5), LR1(6); then RI2(7), LI2(8), RM2(9), LM2 (10), RR2(11), LR2(12); then RI3(13), LI3(14), RM3(15), LM3(16), RR3(17), LR3(18) followed by the little finger keys denoted as RP1(19), LP1(20), RP2(21), LP2(22), RP3 (23), LP3(24), RP4(25) and LP4(26) in that order.

For constructing an Alphabet Keypad according to an embodiment of the present invention, the key of the letter of the alphabet with a higher frequency of occurrence in the environment (CF) is now located on a key location with a greater overall order of ease of use (overall OEU) and so on in descending order. That, is as per Ser 1 to 26 of Table 2 and as per order of overall OEU shown in FIG. 5. Thus the letter key with the highest CF (Ser 1 the letter 'e') is placed/located on the key location with highest overall OEU (marked as '1') and so on in descending order of both CF and Overall OEU both matching each other for all 26 letters of the alphabet and key locations; barring one exception mentioned in the next paragraph.

FIG. 6 shows the Alphabet Keypad for a data entry device according to an embodiment of the present invention. As shown in FIG. 6, the letters 'I' and 'N' (see Ser 4 and 5 of Table 2) have been interchanged so that all vowels are on the right hand side of the Alphabet Keypad according to an embodiment of the present invention. As can be observed from FIG. 6, the vowel keys are outlined in bold. The overall OEU of keys is shown in FIG. 6 and denoted by reference numerals 1 to 26 indicated below the letters. The numbers also correspond to the CF of the letters as in Table 2 except for letter 'I' and letter 'N' which have been interchanged.

Thus the DED Alphabet Keypad as shown in FIG. 6 has; in the upper row of the left half the letter keys Z, Q, C, H, S and the upper row of the right half is has letter keys O, L, D, X, J. The middle row of the left half has letter keys K, R, N, T and the middle row of the right half has letter keys E, A, I, V. The bottom row of the left half has letter keys W, Y, G, M and the bottom row of the right half has letter keys U, P, F, B. All the letter keys are in the said order as read from left to right.

The above construction of the Alphabet Keypad has ensured that the most common six letters are on the Home Keys of the Index, Middle and Ring Fingers. The next most common 12 letters are the second and third letters allotted to these three fingers of both hands. The least common eight letters are allotted to the Little Fingers of both hands.

As shown in FIG. 6 the Alphabet Keypad of the present invention is easy to comprehend, learn and recall. Since the letters are in vertically aligned columns and are also not mixed up with other characters, it makes the construction further easier to comprehend, quicker to learn, easier to use and easier to recall, even after prolonged non-use.

The keys of Alphabet Keypad are of standard size which we can call Size One. In one embodiment of the present invention, they are of size 1.8 cm×1.8 cm including intervening spaces. However, sizes of the key can vary according to the requirements of the manufacturer.

It can be clearly understood FIG. 6 that the Alphabet Keypad of the present invention provides ease of typing.

The construction of the DED of the present invention ensures that the following commonly accepted rules of ease of typing are naturally fulfilled in order of priority as listed below when typing any text document:—
(a) Firstly, on maximum occasions consecutive letters are typed with a different hand.
(b) Secondly, therefore on a much lesser number of occasions, every subsequent letter will be typed with a different finger of the same hand.
(c) Thirdly, on even lesser number of occasions two consecutive letters are typed with the same finger.
(d) Fourthly, on even still lesser number of occasions, letters are typed with the little fingers.
(e) Lastly, on a very minimum number of occasions more than two consecutive letters are typed with the same finger.

The above construction (as shown in FIGS. 5 and 6) gives an optimum workload distribution and superior typing performance as brought out in comparison tests.

FIG. 7 shows a Modified QWERTY Alphabet Keypad adjusted on the DED Alphabet Keypad according to an embodiment of the present invention. As shown in FIG. 7, the DED Alphabet Keypad can be provided with a QWERTY Alphabet Keypad albeit with a minor modification to enable all the alphabets to fit on it; which is as follows. The letters 'A' and 'Z' have to be relocated from the left hand middle and bottom rows on the standard QWERTY Keypad of the IBMW Keyboard to the right hand bottom row on the DED Alphabet Keypad (as shown in FIG. 7). The fingers to be used for typing can be as shown on the top of the keypad in FIG. 7. This is a change from the QWERTY typing pattern where two columns of keys are typed by the index fingers. This modified QWERTY Keypad is easier to use in comparison to the regular QWERTY Alphabet Keypad as the frequently used letter 'A' can now be typed with the right ring finger instead of the left hand little finger.

Thus the Modified QWERTY Alphabet Keypad as shown in FIG. 7 has; in the upper row of the left half the letter keys Q, W, E, R, T and the upper row of the right half is has letter keys Y, U, I O, P. The middle row of the left half has letter keys S, D, F, G and the middle row of the right half has letter keys H, J, K, L. The bottom row of the left half has letter keys X, C, V, B and the bottom row of the right half has letter keys N, M, A, Z. All the letter keys are in the said order as read from left to right.

The above option enables all those who are familiar and comfortable with the QWERTY Keypad and prefer to continue using it, to also upgrade to the DED and enjoy its benefits without losing the comfort of a familiar keypad.

Figure 8:
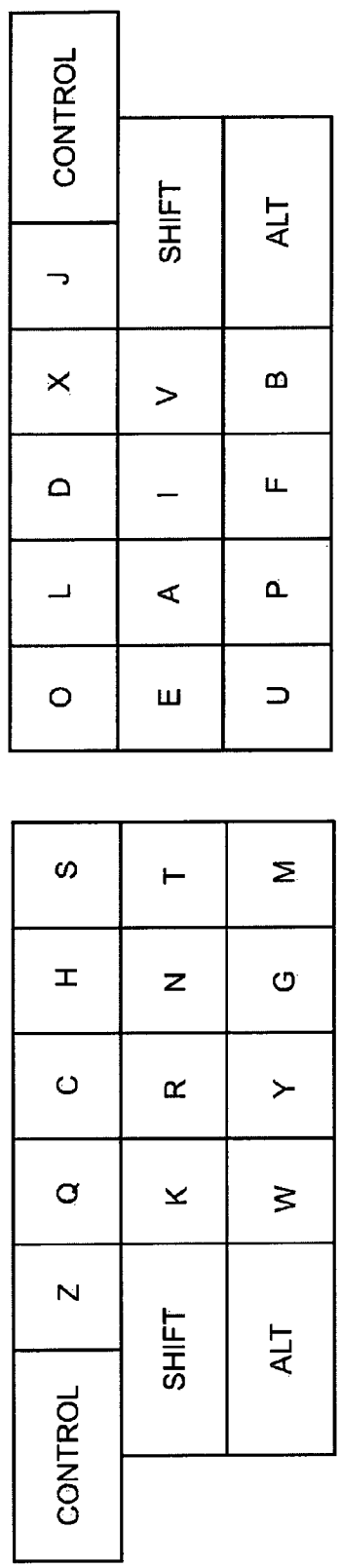
FIG. 8 shows the Lower Left Area and Lower Right Area of the DED of the present invention with the Alphabet Keypad of FIG. 6 according to an embodiment of the present invention.

According to an embodiment of the present invention, the first and the second areas of the DED comprises construction of the Alphabet Keypad as shown in FIG. 5 and FIG. 6 or FIG. 7. FIG. 8 shows the first area (10) and second area (20) of the DED of the present invention with the Alphabet Keypad of FIG. 6 according to an embodiment of the present invention.

Modifier Keys (Part of First and Second Area):

As shown in FIG. 8, the most frequently used modifier keys namely the 'Control', 'Shift' and 'Alt' Keys are provided in the first area and the second area i.e. the lower left area and lower right area.

The modifier keys are disposed on the extreme left and right of the alphabet key rows. There is only one modifier key in each alphabet key row making it very easy for the little fingers to operate them. In an embodiment the 'Control' Key which is the most used among the three modifier keys can be placed in the uppermost row of letters; this being the easiest position of the three available positions to access when used in combination with other keys and the pointing device. The construction of these keys on both the sides is symmetric. The keys can be conveniently used in combination with all other keys and also with the pointing device on the DED and/or with an external pointing device which may be either on the left or the right side.

In an embodiment, the size of these Modifier Keys is Size Three, which can be two standard keys wide. The size of the Modifier Keys can be determined according to the requirement of the manufacturer. The three Modifier Keys can be provided indicator lights of the same colours as the keys. The indicators are placed in the top centre area i.e. on the ninth area of the DED where they can be seen without turning the head. This construction reduces errors while typing and enhances the ease of use of the DED.

Mathematical Keypad (Part of Third Area)

FIG. 9(b) shows the lower centre area i.e. third area (30) of the DED according to an embodiment of the present invention. As shown in FIG. 9(b), the third area (30) comprises the Mathematical Keypad, the 'Enter' Key and the 'Space' Key. Mathematical keypad has been shown in FIG. 9(a). The Mathematical Keypad resembling a familiar calculator keypad is placed in the centre of the DED between the first area and the second area. The construction shown in FIG. 9(a) comprises of 24 keys disposed in six columns and four rows.

As shown in FIG. 9(a), for mathematical operators the regular signs have been used for the division sign (÷) and the multiplication sign (×). The asterisk (*) and slash (/) that were used for multiplication and division signs in prior art are placed on the Symbols Keypad. The construction of the numerals and the mathematical operators are according to a simple calculator keypad.

In an embodiment, as shown in FIG. 9(a), the digits are arranged in the second, third and fourth column from the left in the accepted pattern for calculators with the 'decimal point (.)' in the lowermost key of the third column below the digit '2', the 'equal to (=)' sign in the lowermost key of the fourth column below the digit '3' and the mathematical operators comprising the 'addition sign (+)', the 'subtraction sign (−)', the 'multiplication sign (×)' and the 'division sign (÷)' in the fifth column starting from the top downwards in that order.

As can be observed from FIG. 9(a), the three different types of 'brackets' and the signs of 'greater/lesser than' are placed on either side. The placement is based on their frequency of occurrence and usage logic. The more frequently used ones are placed on the easier to use keys, i.e. starting from the top. The opening brackets are on the left and the closing brackets on the right. According to an embodiment of the present invention the first column from left comprises an 'open small bracket' (left parenthesis) key, an 'open middle bracket' (left square bracket) key, an 'open large bracket' (left curly bracket) key and a 'lesser than sign' key; and the sixth column from left comprises a 'closed small bracket' (right parenthesis) key, a 'closed middle bracket' (right square bracket) key, a 'closed large bracket' (right curly bracket) key and a 'greater than sign' key on the Mathematical Keypad (as shown in FIG. 9(a)).

Referring to FIGS. 9(a) and 9(b), the three columns from the left can be operated by the left index finger and the three columns from the right with the right index finger. The Mathematical Keypad can also be used in the classical manner with the index, middle and ring fingers; but with the additional advantage that it can be used in this manner with either the left hand or the right hand as it is placed in the centre.

The construction shown in FIGS. 9(a) and 9(b) greatly simplifies the use of the mathematical keys. It separates the numerals and mathematical operators from the melee of the alphabet and un-clutters the keyboard. With this construction, having a second row of numerals above the Alphabet Keypad would serve no useful purpose and hence is not required. Also, each key on the Mathematical Keypad has only one character or character-cum-function allotted to it.

The sizes of the mathematical keys can be smaller than that of the alphabet keys and are Size Five i.e. smaller than the Standard Key or Size One key. In one embodiment of the present invention, they are of size 1.6 cm×1.4 cm including intervening spaces. However, mathematical keys can be made of any other suitable size according to the requirement of manufacturers.

Space and Enter Keys (Part of Third Area):

Also, as shown in FIG. 9(b), the lower centre area or third area of the DED comprises the 'Space' Key and the 'Enter' Key.

The 'Space' Key on an average is used 15.2% (not included in Table 2) of the time in all typing. This makes the 'Space' Key the single most often used key amongst the character keys. The 'Space' Key is disposed below the Mathematical Keypad and occupies the right half as shown in FIG. 7. The 'Space' Key is placed such that it can be struck with the Right Thumb. The size of the 'Space' Key can be of Size Four, i.e. two and a half times the width of a Standard Key according to an embodiment of the present invention.

The location and size of the 'Space' Key ensures that the Right Thumb lies along its longer axis in the SRP. This attitude of the Right Thumb makes it very convenient for it to operate the 'Space' Key repeatedly. However, the 'Space' Key can now be used only with the Right Thumb; however this does become a disadvantage at all as the option of using the 'Space' key with both Thumbs is no more necessary as the hands do not have to move from the SRP for typing.

'Enter' is a very important function and used frequently in operating the computer. Therefore, the 'Enter' Key is placed below the left half of the Mathematical Keypad (as shown in FIG. 9(b)). The dimension of 'Enter' Key can be same as of the 'Space' Key which makes it symmetrical and to the left of the 'Space' Key. The 'Enter' Key can be struck with the Left Thumb.

The location and size of the 'Enter' Key ensures that the Left Thumb lies along its longer axis in the SRP. This attitude of the Left Thumb makes it very convenient to operate the 'Enter' Key repeatedly without any loss of rhythm in the typing. The 'Enter' Key is now far easier to use.

In an embodiment of the present invention, a predetermined gap can be provided between the 'Enter' Key and 'Space' Key to avoid accidental operation of each other. In an embodiment of the present invention, the said predetermined gap is preferably 0.6 cm.

Punctuations and Symbols Keypad (Fourth Area)

FIG. 10 shows the fourth area or the middle centre area (40) of the DED. As shown in FIG. 10, the fourth area comprises Punctuation and Symbol keys. As shown in FIGS. 3, 10 and 15, the Punctuation and Symbols Keys have a combined keypad above the Mathematical Keypad. The key size can be smaller and of the same size as the Mathematical Keypad keys. In an embodiment of the present invention the key size is Size Five. However, the Punctuation and Symbol Keys can be made of any other suitable sizes according to the requirement of manufacturers.

The Punctuation Keys comprise 15 Punctuation Marks, whose total CF as a percentage of character keys is 2.08% (see Ser 53 to 67 in Table 2). Two of the punctuations, namely the full stop (.), and the hyphen (-) are also there on the Mathematical Keypad but function as the decimal point and the subtraction sign respectively. Since the full stop (.), and the hyphen (-) have different meanings when used as punctuations in normal text they are replicated here as shown in FIG. 10. The construction shown in FIG. 10 completes the group of Punctuation Keys.

As shown in FIG. 10, the fourth or the middle centre area (40) also comprises Symbol Keys. There are a total of seven symbols including the asterisk. Their CF as a percentage of the character keys is 0.07% (see Ser 69 to 76 in Table 2).

As shown in FIG. 10, according to an embodiment of the present invention the fourth area comprises 12 keys disposed in three rows and four columns. Both punctuations and symbols together make 22 characters. According to an embodiment of the present invention, the construction of the Punctuation and Symbols Keypad comprises of 12 keys in three rows and four columns as shown in FIG. 10 with 24 slots for characters. This leaves two slots free on the top row. All keys on this keypad can be operated by the Index Fingers as is the case with the Mathematical Keypad.

The two columns on the left can be operated by the Left Index Finger and the two columns on the right can be operated by the Right Index Finger.

The frequency of occurrence of both groups of characters is very low. Hence the allotment of characters to keys is based not only on their CF but also on the similarity of characters and type pairs (for instance the punctuations "and ', have been placed adjacent to each other) according to an embodiment of the present invention. This has ensured a logical placement of the punctuations and symbols and their consequent ease of use.

As shown in FIG. 10, the punctuations that end a sentence are on the right half of the keypad and can be operated by right index finger such as the full stop, question and exclamation marks. While those that punctuate a sentence are on the left half and can be operated by left index finger such as the comma and semicolon. The more important characters can be accessed directly and the less important ones by using the 'Shift' Key. The '@' sign for instance though very rare in documents, is very frequently used for typing email addresses, and has therefore been made accessible directly.

As can be seen from FIGS. 10 and 15, the lowermost keys are the easiest to use by any finger from the SRP, hence the punctuation marks having higher CF are laid out starting from bottom and going to the top in descending order. The punctuations are followed by symbols on the upper row. The OEU of the keys of the Punctuation and Symbols Keypad are shown with reference numerals 1 to 16 and 1 to 8 respectively in FIG. 10.

As shown in FIG. 10, the caret symbol (^) is placed in an available slot at No. 13 with the punctuations. In addition, there are also two keys with one free slot each on the Symbols Keypad. The user can be given the option of assigning any two desired characters from the symbols available now or in the future in software onto these keys. The 'Pound (£)' and 'Euro (€)' have been shown for illustration purpose in FIG. 10. As and when the new Rupee Symbol (₹) is incorporated into software it can also be a choice for being assigned to one of these free slots on the keys.

Navigation Keys, Edit Keys and Pointing Device (Fifth and Sixth Area)

According to an embodiment of the present invention the fourth area which is shown in FIG. 10 can be disposed between the fifth area (50) i.e. the middle left area and sixth area (60) i.e. the middle right area and above the third area (30) i.e. the lower centre area.

As described earlier, the middle left area i.e. the fifth area (50) comprises 'Escape', 'Tab' and 'Caps Lock' Keys and the Pointing Device. FIG. 11 shows the fifth area according to an embodiment of the present invention. As shown in FIG. 11, the fifth area lies above the left side Alphabet Keypad. In an embodiment of the present invention the area is equal to two standard keys in depth (i.e. 3.6 cm). It has the pointing device, the 'Caps Lock', 'Tab' and 'Escape' Keys.

In an embodiment of the present invention the pointing device can be a touchpad. As shown in FIGS. 3, 11 and 15 the pointing device is a touchpad with a 'Left-Click' Key and a 'Right-Click' Key which can be located on the left side and the right side of the Touchpad respectively. As can be observed from FIGS. 3, 11 and 15, the 'Left-Click' Key, the 'Right-Click' Key and the 'Caps Lock' Key are placed so as to be aligned in a row. Referring to FIGS. 3 and 15, the 'Right-Click' Key can be aligned in a column with the innermost key in the upper row of the first area; similarly, the 'Left-Click' Key can be aligned in a column with the outermost alphabet key in the upper row of the first area.

In an embodiment of the present invention, the Touchpad is sized and located such that the hand does not have to shift from the SRP to use it. The thumbs also cannot accidentally touch the Touchpad as happens while using notebook PCs available today where the Touchpad is below the main keypad. The 'Left-Click' and 'Right-Click' Keys are placed on either side of the Touchpad, which makes it far easier to use without any awkward twisting of fingers. The actual design, its dimensions and features provided on the Touchpad can be determined according to the requirements of the manufacturer.

According to an embodiment of the present invention, the Touchpad can have vertical and horizontal scroll strips on it and right and left-click keys on either side. The Touchpad itself is best operated by the left hand middle finger and the right and left-click buttons by the left hand index and ring fingers respectively. The horizontal scroll strip can be so located so that it is best operated by the left middle finger and the vertical scroll strip can be so located so that it is best operated by the left index finger.

It can be clearly observed from FIGS. 3, 10, 15 and 16 that all functions of the Touchpad can be used without moving the left hand from its SRP. However, people with very small hands may have to move the palm about 2 to 3 cm forward on a standard size keyboard. Smaller sizes of the DED of the present invention can resolve this problem.

Even though the Touchpad is on the left side, a right handed person can easily use it without any difficulty after the right and left-click keys are reset for use by the left hand. With this arrangement the user can use the Touchpad with the left hand while the right hand is operating the navigation keys. However, a laterally inverted DED can be manufactured without departing from the spirit of the invention, for those who prefer such a data entry device where the Touchpad is on the right and navigation keys are on the left.

In an embodiment the area available for the touchpad is approximately three standard key sizes in width and two standard key sizes in depth. In an embodiment of the present invention the width to depth ratio of the touchpad could match the width to height ratio of the display screen. The left and right-click buttons can be placed on either side'.

In another embodiment of the DED, any other type of pointing device can be incorporated on the fifth area (50) in place of the touchpad.

In an embodiment of the present invention, the DED of the present invention also retains the option of using an external pointing device.

As shown in FIGS. 3, 11 and 15 the fifth area (50) i.e. the middle left area also comprises the 'Caps Lock' Key which is located on the extreme left and above the rows of alphabet keys. On the conventional keyboard (particularly IBMW Keyboard) the 'Caps Lock' Key was placed on the left extreme and in line with the middle row of alphabet keys. This often resulted in the key being struck by mistake by the left little finger. The present invention eliminates this problem of accidental use of the 'Caps Lock' Key.

As can be observed from FIGS. 3, 11 and 15 that in the fifth area (50) i.e. in the middle left area the 'Tab' Key is located above the Alphabet Keypad and is placed above the 'Caps Lock' Key and the 'Escape' Key is placed to the left of the 'Tab' Key.

In an embodiment of the present invention the 'Tab' and 'Escape' Keys can be constructed so as to have the same size. In an embodiment of the present invention the 'Tab' and 'Escape' Keys are Size Two, i.e. 1½ times a Standard Key in width.

FIG. 12 shows the sixth area (60) i.e. the middle right area with the Navigation Keys and the Edit Keys according to an embodiment of the present invention. As shown in FIG. 12, the upper row of keys has, starting from the inner most key, the 'Left Arrow' Key, the 'Up Arrow' Key, the 'Right Arrow' Key, the 'Home' Key, the 'Page-Up' Key and a 'Windows' Key; the bottom row of keys in the sixth area, starting from the innermost key, the 'Backspace' Key, the 'Down Arrow' Key, the 'Delete Key', the 'End' Key, the 'Page-Down' Key and the 'Context Menu' Key. As can be observed from FIG. 12, the 'Left Arrow' Key, the 'Up Arrow' Key, the 'Right Arrow' Key are located in upper row and the 'Down Arrow' Key is located in the bottom row just below the 'Up Arrow' Key so as to form a T shape. It can be clearly under stood from the construction shown in FIG. 12 that the said Arrow Keys can be easily operated by Index, Middle and Ring fingers.

It can be noticed from FIG. 12 that the 'Home' Key and the 'End' Key are located in one column; similarly, the 'Page-Up' Key and the 'Page-Down' Key are located in another column. As shown in FIG. 4(c), the 'Backspace' Key is located to the left of the 'Down Arrow' Key and the 'Delete' Key is located to the right of the 'Down Arrow' Key. This construction is logical as the 'Backspace' Key which is placed on the left of the 'Down Arrow' Key deletes a character to the left of the cursor and the 'Delete' Key which is placed on the right of the 'Down Arrow' Key deletes a character to the right of the cursor.

As shown in FIG. 12, the Navigation Group is located on the right hand side above the Alphabet Keypad. Thus, while the left hand is operating the Touchpad (pointing device) the right hand can operate the Navigation Keys. The arrangement of keys and their dimensions enables all these keys to be used without shifting the right hand from its SRP.

Also, as shown in FIG. 12, the 'Page Up', 'Page Down', 'Home' and 'End Keys' are located together in two adjacent columns which enables their easy use with the index and middle fingers.

According to an embodiment, all the keys in the Navigation Group can be of the same size. In an embodiment, all the keys in this group can be made of Size One, which is the same as the size as a Standard Key.

In the Edit Group the 'Backspace' Key is located (as shown in FIG. 12) where the Index Finger can reach conveniently to correct errors without breaking the typing flow. According to an embodiment of the present invention the key size for 'Backspace' Key is Size Three, which is twice the size of a Standard Key in width. It is located to the left of the 'Down Arrow' Key as it deletes a character to the left of the cursor.

Similarly, the 'Delete' Key is also an equally important key. As shown in FIG. 12, the 'Delete' Key is located to the right of the 'Down Arrow' Key as it deletes a character to the right of the cursor. The 'Delete' Key is always operated after navigating the cursor to a particular place and never in the flow of typing. It is therefore of Standard Key size. The 'Delete' Key can be conveniently operated by the right ring finger in conjunction with the Arrow Keys.

The 'Windows' Key and 'Context Menu' Keys enable navigation to a particular function and have therefore been placed to the right side of the Navigation Keys. They can be operated in conjunction with the Navigation Keys by the right hand with ease. Using these keys in conjunction with the Touchpad which is on the left hand is also easy in the DED of the present invention. These keys are also of Standard Key size i.e. Size One.

'F" Keys (Seventh and Eighth Areas):

FIG. 13, shows the seventh area (70) i.e. top left area and the eighth area (80) i.e. top right area of the DED according to an embodiment of the present invention. As shown in FIG. 13, the seventh area is provided with F Keys selected from 'F1', 'F2', 'F3', 'F4', 'F5', and 'F6' starting from left to right in one row; similarly, the eighth area is provided with F Keys selected from 'F7', 'F8', 'F9', 'F10', 'F11', and 'F12' starting from left to right also in one row. As can be noticed from FIG. 13, the seventh area (70) and the eighth area (80) comprises the F Keys which are twelve in numbers and divided into six each on the left and right halves of the DED. The left half has 'F1' to 'F6' while the right half has 'F7' to 'F12'. The six F Keys each on both halves are laid out in one row in groups of three with a small space in between groups which makes them easier to use. Both halves are symmetric to each other.

Other Technical Function Keys and Insert Key (Ninth Area):

FIG. 14 shows a construction of the ninth area (90) i.e. the top centre area according to an embodiment of the present invention. As shown in FIG. 14, the keys in the ninth area can be selected from but not limited to a 'Function' Key, a 'Symbols' Key, a 'Calculator Mode' Key, a 'Scroll Lock' Key, a 'Pause/Break' Key, a 'Print Screen' Key, a 'System Request' Key and an 'Insert/Help' Key. As shown in FIG. 14, the four indicators can indicate operation of four keys selected from the 'Caps Lock' Key, the 'Control' Key, the 'Shift' Key and the 'Alt' Key. However, the indicators can be configured to indicate the operations of any other keys as desired by the manufacturers.

The construction of the ninth area can be changed according to the requirement of the manufacturer based on the features included and the keys that have been eliminated. Minor variation between notebook and desktop PCs can also be made. If only four or less keys are required, then one line of keys can be eliminated or a set of new functions allotted to the keys which then become free.

As shown in FIG. 14, the Function Key can be located in the upper row on the extreme left. It is usually required only in notebook PCs where controls for monitor settings and miscellaneous functions are the second functions of the F Keys. The Function Key can then be used as a modifier key to select these second functions. It may not be required where separate controls have been provided for these functions.

The 'System Request' and 'Pause/Break' Keys are located in the middle of the upper row. The 'Scroll Lock' and 'Print Screen' are located in the middle of the lower row. Each key has only these functions and no other function thus making their use direct and easy. The Break function which is the second function of the Pause/Break Key can be brought into use in conjunction with the Function Key or Shift Key as desired by the manufacturer.

Some of these keys have been done away by many manufacturers. Thus, if any key in this group is not required it can be discontinued or replaced by any other key suitable for this group. However if additional functions are to be incorporated at the will of the manufacturer they can be added as the second function on these keys in conjunction with the Function or Shift Key as decided by the manufacturer.

Insert/Help Key (Part of Ninth Area):

The 'Insert' Key is rarely used and many manufacturers have done away with it. It could be replaced by a 'Help' Key. This key has been located on the extreme right of the lower row.

Calculator Mode Key (Part of Ninth Area):

In an embodiment, the ninth area i.e. top centre area of the DED of the present invention is optionally provided with a 'Calculator Mode' Key. The 'Calculator Mode' Key can be located on the upper row and on the extreme right. It can be a toggle key that changes the Mathematical Keypad into a simple calculator when the computer is OFF. When the computer is ON, it can activate the onscreen calculator available in Windows or other operating system in use. As stated this can be an optional feature.

Symbol Key (Part of Ninth Area):

As shown in FIG. 14, the 'Symbol' Key is located on the lower row and on the extreme left of the top centre area. Operating the 'Symbol' Key displays the symbols available in MS Word, Excel and Power-point etc. Presently the same operation is performed by Mouse, but needs two left-clicks [Insert>Symbols] after navigating the cursor to the selection. If keys are used, then three keystrokes (Alt>N>U) are required. This new feature will ease the effort required by users who need to frequently use symbols that are not on the keyboard; they will now be available to them with only one key stroke.

Indicators (Part of Ninth Area):

In an embodiment of the present invention all the eight keys in the top centre area i.e. in the ninth area can also function as indicators. The indicators can be configured to remain ON as long as they are in the selected mode or to light up only as long as the keys remain pressed, depending on the mode of operation of the keys.

As shown in FIG. 14, in an embodiment there are four indicator lights located above the eight keys provided in the Top Centre Area. These four indicators can be for 'Caps Lock', 'Control', 'Shift' and 'Alt' Keys. The indicators are placed in the top centre so that they are in the middle of the field of view. The keys and their corresponding indicators can be of the same colour.

Free Space Area (Tenth Area):

As can be clearly understood from the above description, the top, middle and lower areas of the DED have all the mandatory keys required for the operation of the computer. The Free Space Area (100) above these areas as shown in FIG. 3 can be used for providing all additional controls such as Power Keys, Multi-media Keys, Internet Keys Speakers and any other key required for the computer as decided by the manufacturer.

Summary of Keys:

The DED of the present invention is constructed as explained in the previous paragraphs. The DED of the present invention thus constructed is shown in FIG. 15. FIG. 15 shows the DED with all keys marked. There are a total of 105 keys excluding the keys of the touchpad. They are as under:—

| | |
|---|---|
| (a) Alphabets | 26. |
| (b) Punctuations and Symbols | 12. |
| (c) Mathematical Keypad | 24. |
| (d) Space Key | 1. |
| (e) Enter Key | 1. |
| (f) Control, Shift, Alt (2 each) | 6. |
| (g) Caps Lock, Escape, Tab | 3. |
| (h) Arrow Keys (4), Page Up, Page Down, Home, End | 8. |

-continued

| | |
|---|---|
| (i) Windows Key, Context Menu Key | 2. |
| (j) Backspace, Delete | 2. |
| (k) Fn, Sys Request, Pause/Break, Calculator, Symbols, Scroll Lock, Print Screen, Insert/Help | 8. |
| (l) F Keys | 12. |
| (m) Total | 105. |

Size of Hands and Using the DED:

FIG. 16 shows the DED of the present invention superimposed with an average male left and right hands of length 189 mm. The standard size DED is ideally suited for this hand size.

As shown in FIG. 16, the keys are marked in the top right corner with the suggested finger which should use them; however, the user may use any finger he is comfortable with.

FIG. 16 also shows arcs ($A_{HOA}$, $A_{EHOA}$) depicting the likely hand operating area and extended hand operating area indicating the reach of the fingers for a normal size hand of length 189 mm for the Pivot of the hand to the tip of the middle finger. As shown in FIG. 16, each finger has to swing about its pivot (PIVOT) not more than 30-35 degrees left and right from its normal attitude to reach any key. The arcs and other dotted lines are illustrative only.

Variations of the DED:

The above description describes the present invention with reference to an embodiment. However, other changes and modification can be made without departing from the spirit of the present invention. Some of the variations are as follows:

Different Sizes of the DED:

The DED of the present invention can be made in different sizes. A basic feature of the DED is to enable operation of all keys on it without moving the hands from the Standard Resting Position (SRP). While the design caters for this, people with smaller hands may not be able to do so, on a standard size DED. To cater for all hand sizes the DED can be manufactured in three sizes, namely small, standard and large, that would cover the entire range of hand sizes. To cater for the needs of children even smaller sizes could be introduced.

Laterally Inverted Version of the DED:

In an embodiment of the present invention, the DED can also be manufactured in a laterally inverted version, with the option of inverting the entire DED or only selected areas or selected keys. A laterally inverted keyboard may be useful for left-handed people or those who wish to have the pointing device on the right hand side.

DED for Other Languages:

In an embodiment of the present invention, the DED of the present invention can be modified as required to meet the requirements of other languages.

DED for Other Applications:

According to an embodiment of the present invention the construction of DED can be adopted with variations as required for applications such as mobile phones, single hand operation etc.

Calculator Mode:

Some operating systems provide an on screen calculator. There are also many other software which have the facility for mathematical functions. However, to use these facilities the computer has to be 'ON' and running. The Calculator Mode is an optional feature that can be incorporated in the DED according to an embodiment of the present invention. This feature can permit the Mathematical Keypad to function as a simple calculator when the computer is 'OFF'.

The following are the features of the Mathematical Keypad in the Calculator Mode when the computer is switched 'OFF':—
  (a) The Calculator Mode is selected by a toggle switch in the Top Centre Area, which also doubles as an indicator when it is switched 'ON'.
  (b) The 'All Clear' (AC) and 'Clear' (C) Keys (on the 'Enter' and 'Space' Key) will function as such (as shown in FIG. 7).
  (c) As the computer is not switched 'ON' a display will be required to function as readout which can be placed in the Free Space Area (100).

When the computer is switched 'ON' the Mathematical Keypad can function as data entry keys according to the software in use. Also the Windows on-screen calculator is available. The 'Enter' and 'Space' Keys can function as such. The 'Calculator Mode' Key can then be used to bring forth the on screen calculator in this mode.

Colour Coding of Keys on the DED:

According to an embodiment of the present invention, colour coding of keys can be done to enable the user to easily understand the grouping and construction of keys and to quickly learn to use the DED systematically and uniformly. Colour coding of keys can be according to the group that they belong to and the markings of characters and functions according to the recommended finger that will use it. All indicator lights and their corresponding keys can both be of the same colour.

In an embodiment of the present invention, colour coding of the 'Control' Key, 'Shift' Key, 'Alt' Key, 'Caps Lock' Key, the eight function keys in the Top Centre Area, the 'Backspace' Key and 'Delete' Key can be a standard feature. Colour coding of other keys can be optional.

Advantages of the Present Invention

The main advantages of the DED (as shown in FIG. 15) over the conventional IBM Windows based Keyboard are summarised below.
  General:
  (a) The construction of the DED of the present invention is novel and inventive.
  (b) All keys and the pointing device on the DED of the present invention can be operated without moving the hands from their Standard Resting Position.
  (c) The workload on the fingers and hands while working on the DED of the present invention is according to their relative capacity to do work.
  (d) The DED of the present invention has a modular construction such that the various grouping of keys can be used as such to construct keyboards that are suitable for left-handed persons and also for those persons who wish to use the device with a single hand either left or right.
  (e) The DED of the present invention is therefore neat, easily comprehended, easy to learn, easy to use, minimises errors, is inherently more difficult to forget and easy to recall even after prolonged non-use.
  Ergonomics:
  (a) The size of the DED, its construction and spacing of keys are such that all keys and the pointing device can be reached from the Standard Resting Position of the hands without moving them. People with very small hands may need to shift the hands by about 2 cm to reach the 'F' keys in the extremities on a standard size keyboard. The DED of present invention can be made of different sizes for people with smaller and larger hands and children.
  (b) On the DED of the present invention the total range of finger travel up and down is only five regular keys and the lateral movement is only a maximum swing of 30-35 degs to reach any key from the Standard Resting Position.
  (c) The shape of the DED of the present invention is a shallow 'V' with the right and left wings tilted 25 degrees above the lateral horizontal line. This enables the hands to rest on the DED in a natural position and comfortably use it without stress and strain.
  (d) The entire DED of the present invention falls within the field of view of the user when he is looking at any part of the monitor screen.
  (e) The construction of the DED of the present invention is symmetric about the centre, except for the middle left area where the pointing device is located and middle right area where the navigation keys are located. However the construction is such that both the hands can function simultaneously on the Pointing Device and Edit Keys, Navigation Keys and the Windows related keys.
  (f) In the DED of the present invention, all the keys are grouped and placed contiguously on the basis of their function and laid out according to the frequency of usage. Within each group the keys are laid out according to frequency of use and ease of use of the keys.
  (g) In the DED of the present invention, the workload allotted to both hands and all fingers are according to their relative capacity to do work.
  (h) All character keys are arranged in rows and in columns one below the other. There is no staggering of keys from row to row.
  (i) The range of operation of the fingers in typing bulk of the text is kept to the minimum; i.e. a movement of one key up and one key down from the SRP of the fingers on their Home Keys.
  (j) There is no row of keys below the alphabet key rows. This has contributed to the reduction of the range of movement of the fingers.
  (k) Duplication of keys has been eliminated except for three operation keys viz. Control, Shift and Alt being a functional necessity. Only two characters, namely the full stop (.) and hyphen (-) on the Punctuation Keypad are also replicated on the Mathematical Keypad, however with different meanings i.e. as decimal point and minus sign respectively.
  (l) The location and sizes of the keys are according to their usage pattern. On the DED the Pointing Device is part of the keyboard, but better positioned than in current notebooks, thereby negating the requirement of an External Mouse. However the option to have an External Mouse is also there. With the DED the hand movement required to use an External Mouse will be the same irrespective whether it is on the right or the left.
  (m) With the DED of the present invention, the same construction can be used for both the Desktop PC and the Notebook PC. Thus, there will be no requirement of adapting to varying constructions while working on different machines.
  (n) The 'Enter' and 'Space' Keys are allotted to the Left and Right Thumb respectively making optimum use of both the thumbs. This arrangement makes the 'Enter' function significantly easier to use and avoids accidental use of the Right 'Shift' Key and vice-versa as in the IBMW Keyboard.
  (o) The Alphabet Keypad of the DED of the present invention is ergonomically far superior to that of the conventional keyboard.

Character Keys on the DED and Alphabet Keypad of the Present Invention:
  (a) In the DED of the present invention a very major aspect is that the letters of alphabet which account for about 95% of the typing have been separated from the other characters.
  (b) The finger workload allotted to each finger for typing is close to the Ideal Finger Workload. Even though the Index Fingers have more number of keys allotted to them, the total workload on them also matches the Ideal Finger Workload.
  (c) The number of character keys allotted to each hand is equal in number but the workload is according to the relative capacity of the hands to do work.
  (d) On the DED of the present invention the numerals, mathematical operators, punctuations and symbols whose occurrence is low have been allotted to the Index Fingers, making them much more easier to use when required, both from the point of view of ease of access and location.
  (e) The allocation of punctuations and symbols to keys is based on frequency of occurrence, similarity, type pairs and ease of use of keys.
  (f) The punctuations used in the middle of a sentence are on the left half of the keypad while those that end a sentence are on the right half.
  (g) All characters available in the software but not available on a key on the DED can be quickly accessed through a new 'Symbols' Key.
  (h) In the present invention, all typing can now be done without the use of the 'Shift' Key, except for capital letters and ten rarely used punctuations and symbols.
  (i) Twelve of the 22 common punctuations and symbols available on keys on the DED of the present invention can be used directly. The Shift Key has to be used only for the remainder ten punctuations and symbols, whose total occurrence in the environment is only 0.09% i.e. one of these 10 characters is likely to occur once after 1111 other characters.
  (j) The user can add two characters of his choice that are available in the software on to two free slots on the Symbols Keypad on the DED of the present invention.
  (k) The workload allotted to the left hand for typing characters is around 87% of the Right Hand Workload and matches the estimated Ideal Left Hand Workload.
Mathematical Keypad of the DED of the Present Invention:
  (a) The construction of numerals and mathematical operators are based on the standard keypad of a simple calculator.
  (b) The Mathematical Keypad being in the centre can be used by either hand and in any combination of hands and fingers when working on mathematical documents. In normal typing it is best used with both the Index fingers.
  (c) The opening brackets are on the left side and the closing brackets on the right side of the keypad which is logical; thus making their use quick and easy.
  (d) The regular mathematical signs are used for the four basic mathematical operators (+, −, ×, ÷). The asterisk (*) and slash (/) which were used for multiplication and division signs have been grouped with symbols on symbols keypad.
  (e) Each key of the Mathematical Keypad has only one character or an operator on it. Thus the shift key is not required to operate any key on the DED.
  (f) The Mathematical Keypad could also incorporate the option of functioning as a simple calculator, for use when the computer is not switched 'ON'.

Operation Keys on the DED of the Present Invention:
  (a) The 'Caps Lock' Key has been located above the rows of Alphabet Keys. It is better operated by the ring finger instead of the little finger. Its location now also avoids its accidental operation.
  (b) The location of all operation keys on the DED is also symmetric about the centre except for the Fifth and Sixth Areas where the 'Escape' Key, 'Tab' Key, 'Caps Lock' Key and the Pointing device which are on the left and the Navigation Keys (Arrows, 'Page Up', 'Page Down', 'Home' and 'End'), 'Backspace' Key, 'Delete' Key, 'Windows' Key and 'Context Menu' Key which are on the right which cannot be symmetric. But their construction is such that the keys in both areas and pointing device can be used simultaneously and conveniently.
  (c) The Control, Shift and Alt Keys are placed one below the other with only one of them in each row. This enables their easy use by the little fingers which are to operate them. Indicators of corresponding colours can be provided which further facilitate their easy use.
  (d) The Modifier Keys are duplicated with one set each placed symmetrically on both sides being an operational necessity. Where two keys are to be used in conjunction such as "Control+S for 'save'," it is easy to do so with two sets of modifier keys placed conveniently on either for use by each hand.
  (e) Navigation and editing can be done without moving the hands from the SRP.
  (f) On the DED of the present invention the Enter Key has been allotted to the Left Thumb, which now has a dedicated repetitive task and is therefore not under-utilised.
Comparative Performance of the Present Invention:
  (a) The DED Alphabet Keypad alone is about 24% superior to the commonly used QWERTY Alphabet Keypad and up to about 20% superior to the DVORAK Alphabet Keypad in terms of ease of use.
  (b) In addition the DED of the present invention is far superior in other respects as has already been explained above.

The DED of the present invention is systematic, logical, neat, easily comprehended and ergonomically superior. It is easy to learn, easy to use, minimises errors and consequently would result in less medical problems. The use of the DED of the present invention is inherently more difficult to forget and is easier to recall even after prolonged non-use.

The foregoing detailed description has described only a few of the many possible implementations of the present invention. Thus, the description is given only by way of illustration and nothing contained in this section should be construed to limit the scope of the invention.

I claim:
1. A Data Entry Device comprising:
  a first area and a second area symmetrical to the first area; each of the first and the second area including an upper row of five alphabet keys, a middle row of four alphabet keys and a bottom row of four alphabet keys so as to define an Alphabet Keypad; each of the first area and the second area also includes three modifier keys selected from 'Control', 'Shift' and 'Alt' Keys with one each on an outer extremity of the upper, middle and bottom row of the first and second areas;
  a third area disposed in between the first and the second area, the third area including four rows of keys with six keys in each row so as to define a Mathematical Keypad and 'Enter' and 'Space' Keys disposed below the Mathematical Keypad;

a fourth area located immediately above the third area, the fourth area including three rows of keys with each row being provided with four punctuation/symbol keys so as to define a Punctuation and Symbols Keypad;

a fifth area located above the first area, the fifth area including a 'Caps Lock' Key located at an extreme left position in the fifth area and above the modifier key of the upper row of the first area, an 'Escape' Key and a 'Tab' Key located at the extreme left position in the fifth area and above the 'Caps Lock' Key, and a pointing device located to the right side of the 'Escape' Key, the 'Tab' Key and Caps Lock Key;

a sixth area located above the second area, the sixth area including two rows provided with six keys in each row including Navigation Keys and Edit Keys in which the Navigation Keys are selected from the group comprising an 'Up Arrow' Key, a 'Down Arrow' Key, a 'Left Arrow' Key, a 'Right Arrow' Key, a 'Page-Up' Key, a 'Page Down' Key, a 'Home' Key, an 'End' Key, a 'Windows' Key and 'Context Menu' Key and the Edit Keys are selected from a 'Backspace' Key and a 'Delete' Key;

a seventh area and an eighth area located above the fifth area and the sixth area respectively; each of the seventh area and the eighth area are provided with a row of six F keys each comprising keys F1, F2, F3, F4, F5 and F6 being disposed on the seventh area and keys F7, F8, F9, F10, F11 and F12 being disposed on the eighth area; and a ninth area located above the fourth area and disposed between the fifth and seventh area on the left and the sixth and eighth areas on the right and, the ninth area including two rows of keys with each row provided with four keys and a set of indicators above the two rows of keys.

2. A Data Entry Device as claimed in claim 1, wherein the first, fifth and seventh areas forms a left wing of the Data Entry Device, and the second, sixth and eighth areas forms a right wing of the Data Entry Device in which the left wing and the right wing are placed at a predetermined angular position equally with respect to the third, fourth and ninth areas so as to form a 'V' construction of the Data Entry Device.

3. A Data Entry Device as claimed in claim 1, wherein the Pointing Device is selected from the group comprising a scrolling ball, joy stick and pointing stick, or a touchpad with a left-click key and a right-click key being disposed on left and right sides of the touchpad respectively.

4. A Data Entry Device as claimed in claim 1, wherein the 'Space' Key and the 'Enter' Key are disposed in a row below the Mathematical Keypad with a predetermined gap between the 'Space' Key and the 'Enter' Key.

5. A Data Entry Device as claimed in claim 1, wherein in the sixth area:
the 'Up Arrow' Key, the 'Left Arrow' Key and the 'Right Arrow' Keys are provided in an upper row and the 'Down Arrow' Key is located in a lower row below the upper row so that the arrow keys form a T shape;
the 'Home' Key and the 'End' Key are located one below the other in one column and the 'Page-Up' Key and the 'Page-Down' Key are located one below the other in another column;
the 'Backspace' Key is located to the left of the Down Arrow Key and the 'Delete' Key is located to the right of the Down Arrow Key; the Windows Key and the Context Menu Key are located to the right of the arrow keys.

6. A Data Entry Device as claimed in claim 1, wherein in the ninth area, the two rows comprise keys selected from the group comprising a 'Function' Key, a 'System Request' Key, a 'Pause/Break' Key, a 'Calculator Mode' Key, a 'Symbols' Key, a 'Scroll Lock' Key, a 'Print Screen' Key and a 'Insert/Help' Key; and the set of indicators comprises indicators for indicating operation of one or more keys selected from the group comprising the 'Caps Lock', 'Control', 'Shift' and 'Alt' Keys.

7. A Data Entry Device as claimed in claim 1, wherein, in the Alphabet keypad, in the first area and the second area, the keys of the three rows are aligned one below the other starting with innermost keys of the three rows such that the fifth key of the upper row on both the areas is on an outer extreme and have no alphabet key below the fifth key.

8. A Data Entry Device as claimed in claim 7, wherein, in the Alphabet keypad, innermost three keys of the middle row and an outermost key of the bottom row on each of the first area and the second area are designated as Home Keys of Index, Middle, Ring and Little Fingers of a left hand and a right hand respectively; and letters of the alphabet keypad are letters of the English alphabet having 26 letters that are placed based on frequency of occurrence of letters in English language text predetermined from a select set of documents in English and an order of ease of use of the keys is established such that the letters of the English alphabet having highest frequency of occurrence are placed at the location with highest order of ease of use of the keys and so on in descending order for all 26 letters and 26 keys, wherein the Order of Ease of Use of the keys, in descending order, is the sequence in the order of the Home Keys of Index, Middle and Ring finger on both the first area and the second area, followed by the three keys in the upper row located in alignment with the Home Keys in the same order, followed by the three keys in the bottom row located in alignment with the Home Keys in the same order, followed by Home Keys of the little fingers on both the first area and second area, in the bottom row, followed by the keys in the middle row in alignment with the Home Keys of the little fingers, followed by the keys in the upper row in alignment with the Home Keys of the little fingers and then followed by the outermost keys in the upper row; provided that each key on the second area takes a higher precedence than the corresponding key on the first area such that the order alternates between the second area and the first area;
and the arrangement: firstly, maximises the occasions on which consecutive letters are typed with a different hand; secondly, resulting in minimising the occasions on which every subsequent letter are typed with a different finger of the same hand; thirdly, resulting in further minimising the number of occasions in which two consecutive letters are typed with the same finger; fourthly, resulting in even further minimising the number of occasions in which letters are typed with the little fingers; and fifthly, resulting in still further minimising the number of occasions in which more than two consecutive letters are typed with the same finger.

9. A Data Entry Device as claimed in claim 8, wherein the frequency of occurrence of letters of the Alphabet in English language text, beginning with the letter with highest frequency of occurrence, in descending order is: E, T, A, I, N, R O, S, L, H, D, C, U, M, P, G, F, Y, B, W, V, K, X, Q, J, Z; which are distributed in the keypad based on the order of ease of use of the keys so that the keys located in the upper row in the first area are letter keys Z, Q, C, H, S and the keys in the upper row in the second area are letter keys O, L, D, X, J; the middle row in the first area comprises letter keys K, R, N, T and the middle row in the second area comprises letter keys E, A, I, V; the bottom row in the first area comprises letter keys W, Y, G, M and the bottom row in the second area comprises letter keys U, P, F, B; in that order and all read from left to right.

10. A Data Entry Device as claimed in claim 1, wherein in the fourth area, the Punctuation and Symbols Keypad enables a user to input punctuations or symbols, and the keys of the fourth area include four columns of keys in which each of the keys is constructed with two punctuations and/or symbols on it that are operated directly or in conjunction with one of the 'Shift' keys.

11. A Data Entry Device as claimed in claim 10, wherein the Punctuation and Symbols Keypad also comprises a 'Full Stop (.)' Key and a 'Hyphen (-)' Key.

12. A Data Entry Device as claimed in claim 1, wherein the keys of the Mathematical Keypad form six columns in which:
 a first column and a sixth column to the right of the first column comprise an open small bracket (left parenthesis) key and a close small bracket (right parenthesis) key; an open middle bracket (left square bracket) key and a close middle bracket (right square bracket) key; an open large bracket (left curly bracket) key and a close large bracket (right curly bracket) key; and 'lesser than' sign and 'greater than' sign keys, respectively;
 a second column, a third column and a fourth column comprising number keys, a 'decimal (.)' key and an 'equal to (=)' key;
 a fifth column having mathematical operator keys comprising 'addition (+)', 'subtraction (−)', 'multiplication (×)' and 'division (÷)' keys, and the first to sixth columns are arranged from left to right.

13. A Data Entry Device as claimed in claim 1, wherein the keys located in the upper row of the first area are letter keys Q, W, E, R, T and keys located in the upper row of the second area are letter keys Y, U, I, O, P; the keys located in the middle row of the first area are letter keys S, D, F, G and keys located in the middle row of the second area are letter keys H, J, K, L; the keys located in the bottom row of the first area are letter keys X, C, V, B and keys located in the bottom row of the second area are letter keys N, M, A, Z; in that order and all read from left to right.

14. A Data Entry Device as claimed in claim 1, wherein the Alphabet Keys in the first area are laterally inverted and placed in the second area and the alphabet keys in the second area are laterally inverted and placed in the first area; and/or the construction of the keys and the pointing device in the fifth area are laterally inverted and placed in the sixth area and the construction of the keys in the sixth area are laterally inverted and placed in the fifth area.

15. A Data Entry Device as claimed in claim 1, wherein the alphabet keys located in the upper row of the first area are letter keys Z, Q, C, H, S and the alphabet keys in the upper row of the second area comprises letter keys O, L, D, X, J; the alphabet keys in middle row in the first area comprises letter keys K, R, N, T and the alphabet keys in the middle row in the second area comprises letter keys E, A, I, V; the alphabet keys in the bottom row in the first area comprises letter keys W, Y, G, M and the alphabet keys in the bottom row in the second area comprises letter keys U, P, F, B; in that order and all read from left to right.

16. An Alphabet Keypad for a Data Entry Device, comprising a left half and a right half symmetrical to the left half; each of the left and the right half consisting of thirteen keys arranged in three rows including an upper row of five keys, a middle row of four keys and bottom row of four keys; in the left half and the right half, the keys of the three rows are aligned one below the other starting with innermost keys of the three rows such that a fifth key of the upper row on both halves is on an outer extreme and have no alphabet key below the fifth key;
 innermost three keys of the middle row and an outermost key of the bottom row on each half are designated as Home Keys of Index, Middle, Ring and Little Fingers of each hand respectively;
 and letters of the alphabet keypad are letters of the English alphabet having 26 letters, and the letters of the English alphabet are placed based on frequency of occurrence of letters predetermined from selected set of documents in English and an order of ease of use of keys as established such that the letters of the alphabet having highest frequency of occurrence are placed at locations with highest Order of Ease of use of the keys and so on in descending order for all 26 letters and 26 keys, wherein the Order of Ease of Use of the keys, in descending order, is the following sequence: the Home Keys of Index, Middle and Ring finger on both halves, followed by the three keys in the upper row located in alignment with the Home Keys in the same order, followed by the three keys in the bottom row located in alignment with the Home Keys in the same order, followed by Home Keys of the little fingers of both the left half and right half, in the bottom row, followed by the keys in the middle row in alignment with the Home Keys of the little fingers, followed by the keys in the upper row in alignment with the Home Keys of the little fingers and then followed by the outermost keys in the upper row; and each key on the right half takes a higher precedence than the corresponding key on the left half such that the order alternates between the right half and the left half;
 and the arrangement; firstly, maximises the occasions on which consecutive letters are typed with a different hand; secondly, resulting in minimising the occasions on which every subsequent letter are typed with a different finger of the same hand; thirdly, resulting in further minimising the number of occasions in which two consecutive letters are typed with the same finger; fourthly, resulting in even further minimising the number of occasions in which letters are typed with the little fingers; and fifthly, resulting in still further minimising the number of occasions in which more than two consecutive letters are typed with the same finger.

17. An Alphabet Keypad as claimed in claim 16, wherein the frequency of occurrence of letters of the alphabet, beginning from highest frequency of occurrence, in descending order is: E, T, A, I, N, R O, S, L, H, D, C, U, M, P, G, F, Y, B, W, V, K, X, Q, J, Z which are distributed in the keypad based on the order of ease of the keys use so that the keys located in the upper row of the left half are letter keys Z, Q, C, H, S and the keys in the upper row of the right half are letter keys O, L, D, X, J; the middle row in the left half comprises letter keys K, R, N, T and the middle row in the right half comprises letter keys E, A, I, V; the bottom row in the left half comprises letter keys W, Y, G, M and the bottom row in the right half comprises letter keys U, P, F, B; in that order and all read from left to right.

18. An Alphabet Keypad as claimed in claim 16, wherein the construction of the keys on the left half are laterally inverted and placed in the right half, and the construction of the keys of the right half are laterally inverted and placed in the left half for a left handed user.

19. An Alphabet Keypad as claimed in claim 18, wherein the keys located in the upper row of the left half are letter keys J, X, D, L, O and the keys in the upper row of the right half are letter keys S, H, C, Q, Z; the keys located in the middle row in the left half are letter keys V, I, A, E and the keys located in the middle row in the right half are letter keys T, N, R, K; the keys located in the bottom row in the left half are letter keys B, F, P, U, and the keys located in the bottom row in the right half are letter keys M, G, Y, W; in that order and all read from left to right.

* * * * *